(12) United States Patent
Hafenrichter et al.

(10) Patent No.: US 10,773,761 B2
(45) Date of Patent: Sep. 15, 2020

(54) WALKING ROBOT

(71) Applicant: The Boeing Company, Chicago, IL (US)

(72) Inventors: Joseph Lawrence Hafenrichter, Seattle, WA (US); Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 223 days.

(21) Appl. No.: 15/833,035

(22) Filed: Dec. 6, 2017

(65) Prior Publication Data

US 2018/0099710 A1    Apr. 12, 2018

Related U.S. Application Data

(63) Continuation of application No. 14/885,360, filed on Oct. 16, 2015, now Pat. No. 10,232,897.

(51) Int. Cl.
| | |
|---|---|
| *B62D 57/032* | (2006.01) |
| *B25J 11/00* | (2006.01) |
| *B25J 15/00* | (2006.01) |
| *B64F 5/40* | (2017.01) |
| *B64F 5/10* | (2017.01) |

(52) U.S. Cl.
CPC .......... *B62D 57/032* (2013.01); *B25J 11/005* (2013.01); *B25J 11/0055* (2013.01); *B25J 11/0065* (2013.01); *B25J 11/0075* (2013.01); *B25J 11/0085* (2013.01); *B25J 15/0019* (2013.01); *B64F 5/10* (2017.01); *B64F 5/40* (2017.01); *Y10S 901/01* (2013.01)

(58) Field of Classification Search
CPC .. B25J 15/0019; B25J 11/005; B25J 11/0075; B25J 11/0065; B25J 11/0085; B25J 11/0055; B62D 57/032; B64F 5/40; B64F 5/10; Y10S 901/01
See application file for complete search history.

(56) References Cited

U.S. PATENT DOCUMENTS

| | | | |
|---|---|---|---|
| 4,993,913 A | * | 2/1991 | Ohtsuki ................... B25J 5/00 414/729 |
| 5,551,525 A | * | 9/1996 | Pack ................... B62D 57/024 180/8.6 |
| 6,927,560 B2 | | 8/2005 | Pedigo et al. |
| 7,498,796 B2 | | 3/2009 | Georgeson et al. |
| 7,768,249 B2 | | 8/2010 | Georgeson et al. |

(Continued)

OTHER PUBLICATIONS

"GAM Hammer"; restorationhardware.com; Aug. 10, 2014 (Year: 2014).*

(Continued)

*Primary Examiner* — Stephen Holwerda
(74) *Attorney, Agent, or Firm* — Yee & Associates, P.C.

(57) ABSTRACT

A method and apparatus for a walking robot. A first end effector connected to a first end of a robotic arm is moved relative to a surface of a structure and away from a second end effector connected to a second end of the robotic arm. The first end effector is secured relative to the surface of the structure after moving the first end effector relative to the surface. The second end effector connected to the second end of the robotic arm is moved relative to the surface of the structure and toward the first end effector.

20 Claims, 18 Drawing Sheets

(56) References Cited

U.S. PATENT DOCUMENTS

| | | | |
|---|---|---|---|
| 7,768,250 B2 | 8/2010 | Georgeson et al. | |
| 8,467,925 B2 | 6/2013 | Troy | |
| 8,713,998 B2 | 5/2014 | Troy et al. | |
| 8,738,226 B2 | 5/2014 | Troy et al. | |
| 8,807,257 B1 | 8/2014 | Hansen et al. | |
| 8,812,154 B2 | 8/2014 | Vian et al. | |
| 8,892,252 B1 | 11/2014 | Troy et al. | |
| 9,043,146 B2 | 5/2015 | Troy et al. | |
| 9,156,321 B2 | 10/2015 | Troy et al. | |
| 9,197,810 B2 | 11/2015 | Troy et al. | |
| 9,410,659 B2 | 8/2016 | Troy et al. | |
| 2008/0077276 A1* | 3/2008 | Montero Sanjuan | B21J 15/14 700/245 |
| 2011/0180333 A1* | 7/2011 | Niederberger | E04G 23/002 180/8.6 |
| 2011/0295426 A1* | 12/2011 | Georgeson | B25J 9/1625 700/258 |
| 2012/0103705 A1* | 5/2012 | Schlee | B25J 9/065 180/14.1 |
| 2012/0272505 A1* | 11/2012 | Sarh | B25H 9/0084 29/525.01 |
| 2013/0109277 A1* | 5/2013 | Panergo | B24B 19/26 451/5 |
| 2013/0166071 A1* | 6/2013 | Kranz | B25J 15/0095 700/260 |
| 2013/0289766 A1* | 10/2013 | Hafenrichter | G01N 27/90 700/245 |
| 2014/0182479 A1* | 7/2014 | Hafenrichter | B64F 5/60 105/30 |
| 2017/0106924 A1 | 4/2017 | Hafenrichter et al. | |

OTHER PUBLICATIONS

Notice of Allowance, dated Nov. 1, 2018, regarding U.S. Appl. No. 14/885,360, 10 pages.

Office Action, dated May 31, 2017, regarding U.S. Appl. No. 14/885,360, 21 pages.

Troy et al., "Remotely Operated Mobile Stand-Off Measurement and Inspection System," U.S. Appl. No. 13/892,236, filed May 13, 2013, 56 pages.

Final Office Action, dated Nov. 14, 2017, regarding USPTO Application No. , 15 pages.

* cited by examiner

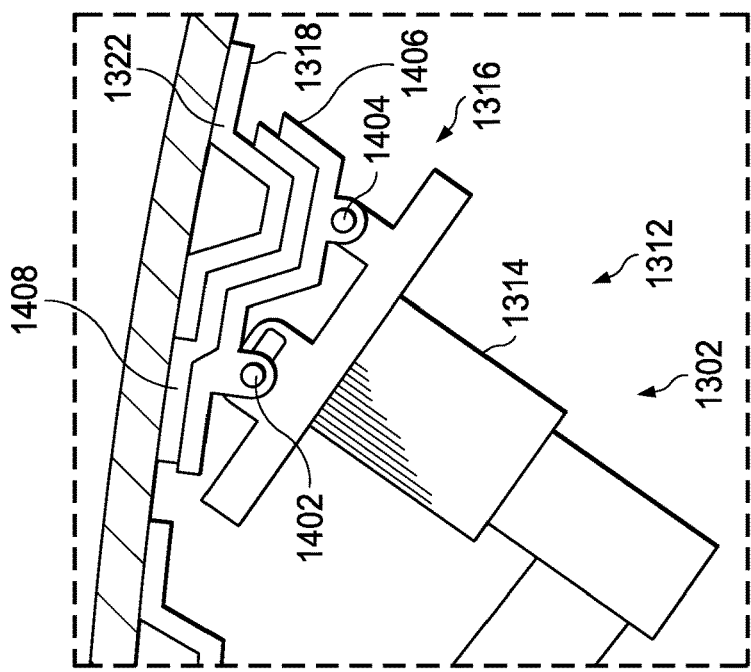
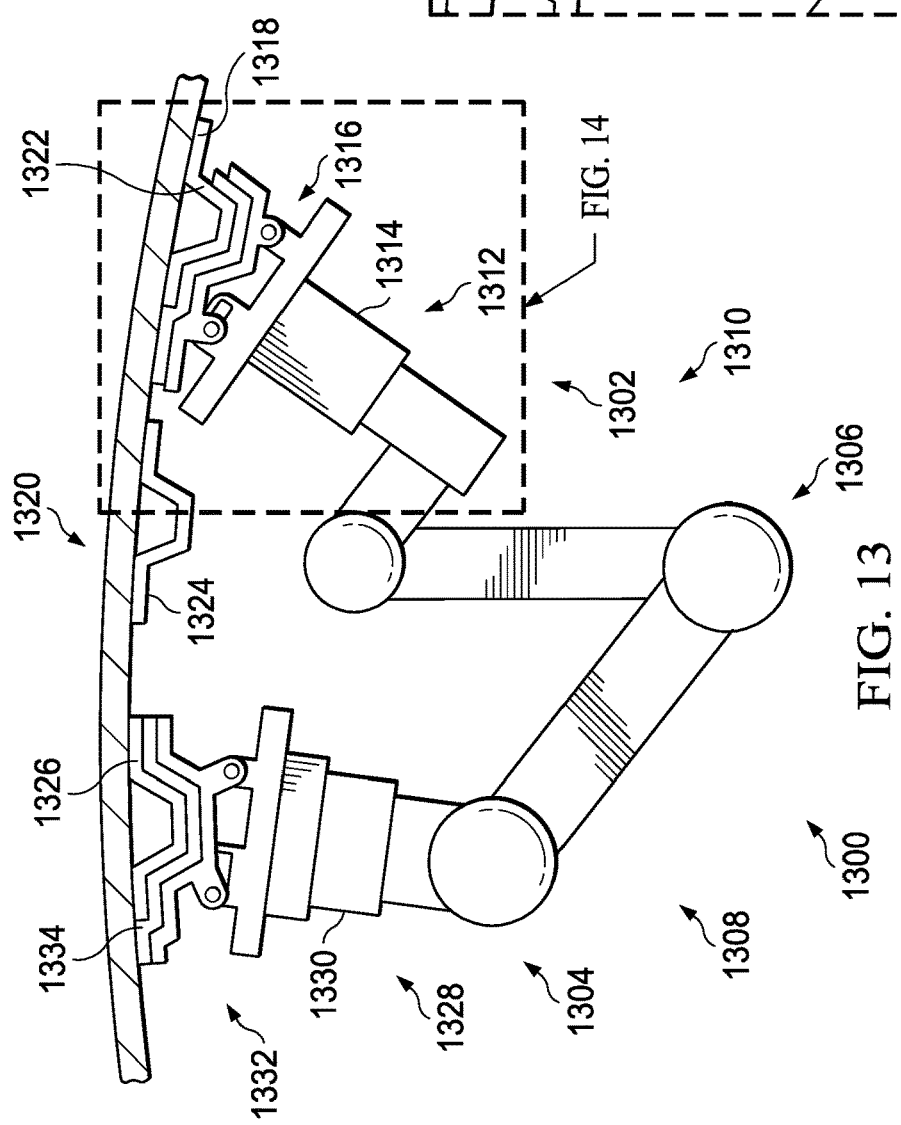
FIG. 14
FIG. 13

WALKING ROBOT

CROSS REFERENCE TO RELATED APPLICATION

This application is a continuation of the following patent application entitled: "Walking Robot," application Ser. No. 14/885,360, filed on Oct. 16, 2015, now U.S. Pat. No. 10,232,897, assigned to the same assignee, and incorporated herein by reference in its entirety.

BACKGROUND INFORMATION

1. Field

The present disclosure relates generally to robotics and, in particular, to performing functions on a structure using a robot. More particularly, the present disclosure relates to a method and apparatus for performing functions on a structure using a walking robot.

2. Background

During manufacturing or maintenance, functions such as drilling, inspection, or fastening may be performed on structures using robots. Conventional robots, such as robotic arms, may be larger, heavier, less agile, or more costly than desired. For example, conventional robotic arms may be anchored to a manufacturing floor. Conventional robotic arms may use floor supports or other fixtures to support the weight of the robots. Due to at least one of the size or weight of conventional robotic arms, a limited quantity of conventional robots may be used at a workstation.

By limiting the quantity of conventional robots that can be used at a workstation, the speed at which a structure is completed may be limited. The speed at which a structure is completed may be directly related to the quantity of robots being used.

Further, conventional robots may be positioned based on a known shape or configuration of a structure. For tall structures, conventional robots may be anchored to platforms. To perform functions on a structure having a different shape, the position of conventional robots may be changed. Changing the position of a conventional robot may be more time-consuming, more labor intensive, or more expensive than desired. For example, utilities, fixturing, and supports for conventional robots may be set-up before moving a conventional robot.

Therefore, it would be desirable to have a method and apparatus that take into account at least some of the issues discussed above, as well as other possible issues. For example, it may be desirable to decrease manufacturing time for a structure using robots. As another example, it may be desirable to provide robots that may work on variety of structures.

SUMMARY

An embodiment of the present disclosure provides a robotic arm comprising a first end connected to a first end effector, and a second end connected to a second end effector.

Another embodiment of the present disclosure provides an apparatus comprising a pedestal type robot having a first end and a second end. A first end effector is connected to the first end of the pedestal type robot in which the first end effector comprises a first foot. A second end effector is connected to the second end of the pedestal type robot.

Yet another embodiment of the present disclosure provides a method. A first end effector connected to a first end of a robotic arm is moved relative to a surface of a structure and away from a second end effector connected to a second end of the robotic arm. The first end effector is secured relative to the surface of the structure after moving the first end effector relative to the surface. The second end effector connected to the second end of the robotic arm is moved relative to the surface of the structure and toward the first end effector.

Still yet another embodiment of the present disclosure provides another method. A robot is walked across the surface of a structure using a first foot connected to a first end of the robot, and a second foot connected to a second end of the robot. A function is performed on the surface using the robot after walking the robot across the surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of a walking robot having a number of conformal suction feet in accordance with an illustrative embodiment;

FIG. 14 is an illustration of a conformal suction foot of a walking robot in accordance with an illustrative embodiment;

DETAILED DESCRIPTION

The illustrative embodiments recognize and take into account one or more different considerations. For example, the illustrative embodiments recognize and take into account that currently, a variety of robotic arms of different sizes and configurations may be available. For example, to access large structures, conventional robotic arms may be as tall as, or taller than, an average human operator. These robotic arms may be larger, heavier, less agile, or more costly than desired. Smaller robotic arms may be approximately the same length as a human arm. Smaller robotic arms may weigh less and cost less than larger robotic arms. However, smaller robotic arms may have a limited range in which they can work.

Figure 1:
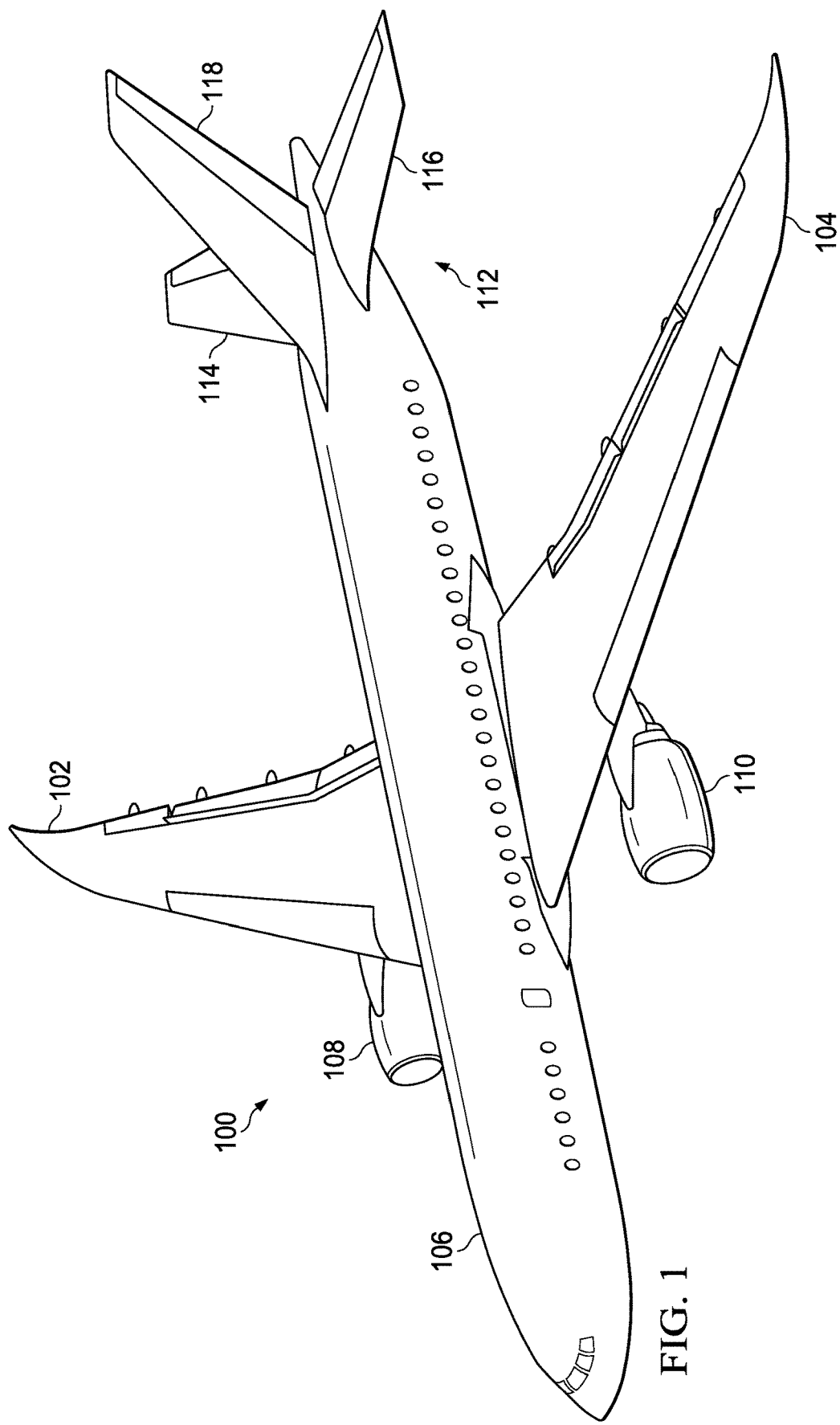
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 may have wing 102 and wing 104 attached to body 106. Aircraft 100 may include engine 108 attached to wing 102 and engine 110 attached to wing 104.

Body 106 may have tail section 112. Horizontal stabilizer 114, horizontal stabilizer 116, and vertical stabilizer 118 may be attached to tail section 112 of body 106.

Aircraft 100 may be an example of an aircraft that may have functions performed by a number of walking robots in accordance with an illustrative embodiment. As used herein, "a number of" items includes one or more items. For example, a number of walking robots includes one or more robots. A portion of body 106 may have manufacturing functions performed by walking robots. As another example, one of wing 102 or wing 104 may be inspected using a number of walking robots. A maintenance function may be performed on any desirable portion of aircraft 100 using a number of walking robots.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, and other suitable types of aircraft.

Figure 2:
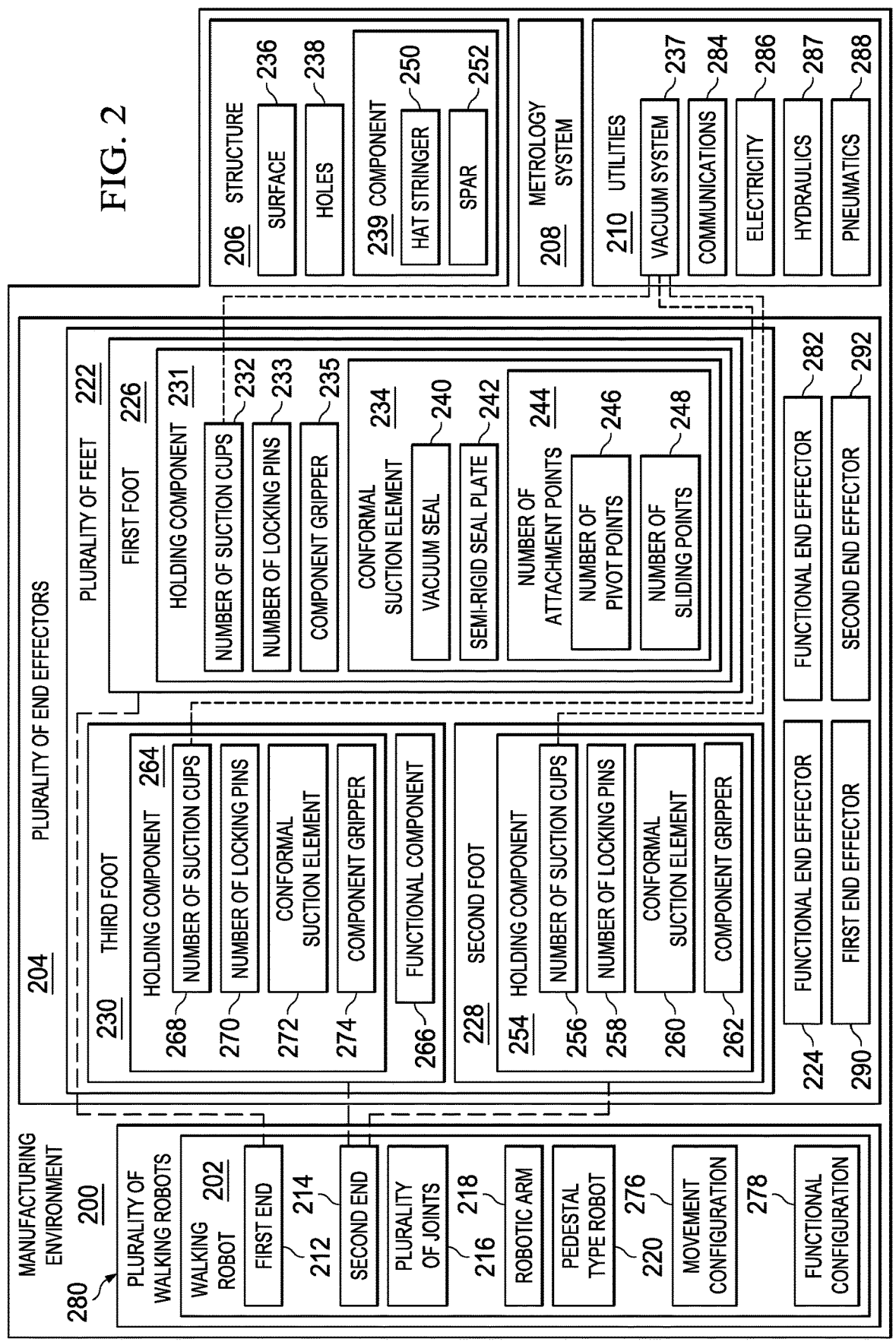
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to perform functions on a component of aircraft 100.

Manufacturing environment 200 includes walking robot 202, plurality of end effectors 204, structure 206, metrology system 208, and utilities 210. Walking robot 202 may include first end 212 and second end 214 connected by plurality of joints 216. Plurality of joints 216 may allow first end 212 and second end 214 to move within a plurality of axes.

In some illustrative examples, walking robot 202 may take the form of robotic arm 218. Robotic arm 218 may be a mechanical manipulator that may move to resemble a human arm.

In some illustrative examples, walking robot 202 may be pedestal type robot 220. In these illustrative examples, pedestal type robot 220 may not be statically mounted to a floor, fixture, rail cart, or some other conventional mounting scenario. When walking robot 202 takes the form of pedestal type robot 220, pedestal type robot 220 may be a traditional pedestal robot meeting desired specifications. Desired specifications for pedestal type robot 220 may include at least one of a desirable weight, a desirable length, a desirable width, a desirable height, a desirable quantity of joints, a desirable working load capacity, or a desirable type of joints. For example, pedestal type robot 220 may have a weight such that the weight of pedestal type robot 220 does not undesirably impact structure 206 as walking robot 202 works on structure 206.

First end 212 may connect to any desirable end effector of plurality of end effectors 204. Second end 214 may connect to any desirable end effector of plurality of end effectors 204.

Plurality of end effectors 204 may include plurality of feet 222 and functional end effector 224. Plurality of feet 222 may include first foot 226, second foot 228, and third foot 230. First foot 226 may include holding component 231. Holding component 231 may hold first foot 226 against structure 206. Holding component 231 may take the form of at least one of number of suction cups 232, number of locking pins 233, conformal suction element 234, or component gripper 235.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

First foot 226 may be connected to first end 212. Walking robot 202 may use first foot 226 to walk across structure 206. When first foot 226 contacts structure 206, holding component 231 may hold first foot 226 against surface 236 of structure 206. In these illustrative examples, first foot 226 may not be statically mounted to a floor, a fixture, a rail cart, or some other conventional mounting scenario.

For example, number of suction cups 232 may be connected to vacuum system 237 of utilities 210. Vacuum system 237 may provide vacuum to number of suction cups 232 to hold first foot 226 against surface 236.

When holding component 231 takes the form of number of locking pins 233, number of locking pins 233 may extend through holes 238 in structure 206. Number of locking pins 233 may be activated when number of locking pins 233 extends through holes 238. When number of locking pins 233 is activated, components may extend outward from the number of shafts of number of locking pins 233 to lock number of locking pins 233 in place. Number of locking pins 233 may hold first foot 226 against surface 236 of structure 206. Number of locking pins 233 may be deactivated by pressing buttons associated with number of locking pins 233. When number of locking pins 233 is deactivated, the components may be retracted into the number of shafts of number of locking pins 233. When number of locking pins 233 is deactivated, number of locking pins 233 may be removed from holes 238.

When holding component 231 takes the form of conformal suction element 234, first foot 226 may be held against component 239 of structure 206. When holding component 231 takes the form of conformal suction element 234, first foot 226 may be referred to as a conformal suction foot. Conformal suction element 234 may be shaped to conform to component 239 of structure 209. Conformal suction element 234 may include a number of components. For example, conformal suction element 234 may include vacuum seal 240 and semi-rigid seal plate 242. Semi-rigid seal plate 242 may have a shape complementary to component 239. In some examples, conformal suction element 234 may also include number of attachment points 244. Number of attachment points 244 may include number of pivot points 246. Number of attachment points 244 may include number of sliding points 248. The number of attachment points may allow semi-rigid seal plate 242 to have movement relative to first end 212.

In some illustrative examples, component 239 may take the form of hat stringer 250. When component 239 is hat stringer 250, conformal suction element 234 may have a shape complementary to hat stringer 250.

When holding component 231 takes the form of component gripper 235, component gripper 235 may grip component 239. For example, component 239 may take the form of spar 252. Component gripper 235 may clamp onto either side of spar 252 to hold first foot 226 relative to spar 252.

Second end 214 may connect to any desirable end effector of plurality of end effectors 204. Second end 214 may be connected to one of second foot 228 or third foot 230. Second foot 228 may be substantially the same as first foot 226. In these illustrative examples, second foot 228 may not be statically mounted to a floor, a fixture, a rail cart, or some other conventional mounting scenario.

Second foot 228 may include holding component 254. Holding component 254 may hold second foot 228 against structure 206. Holding component 254 may take the form of at least one of number of suction cups 256, number of locking pins 258, conformal suction element 260, or component gripper 262.

In some illustrative examples, holding component 231 and holding component 254 may be the same type of holding component. For example, when holding component 231 includes number of suction cups 232, holding component 254 may include number of suction cups 256. As another example, when holding component 231 is conformal suction element 234, holding component 254 may be conformal suction element 260. Conformal suction element 234 may be substantially the same as conformal suction element 260. In some illustrative examples, the shape of conformal suction element 234 may be different than conformal suction element 260.

Third foot 230 may include holding component 264 and functional component 266. Holding component 264 may hold second foot 228 against structure 206. Holding component 264 may take the form of at least one of number of suction cups 268, number of locking pins 270, conformal suction element 272, or component gripper 274.

In some illustrative examples, holding component 231 and holding component 264 may be the same type of holding component. For example, when holding component 231 includes component gripper 235, holding component 264 may include component gripper 274. As another example, when holding component 231 includes number of locking pins 233, holding component 264 may include number of locking pins 270.

Functional component 266 may be any desirable functional component. For example, functional component 266 may be an end effector configured to perform any desirable function such as drilling, cutting, trimming, milling, welding, inspecting, remote viewing, sealing, sanding, cleaning, painting, buffing, drying, or any other desirable function. Functional component 266 may be selected from at least one of a drill, a brush, a sander, a cleaning tool, a paint gun, a buffer, a cutting tool, a welding tool, a camera, a probe, or a non-destructive sensor.

When walking robot 202 is in movement configuration 276, both first end 212 and second end 214 may be connected to respective feet in plurality of feet 222. For example, in movement configuration 276, first end 212 may be connected to first foot 226, and second end 214 may be connected to second foot 228. In another example, in movement configuration 276, first end 212 may be connected to first foot 226, and second end 214 may be connected to third foot 230. In yet another illustrative example, first end 212 may be connected to third foot 230, while second end 214 may be connected to either of first foot 226 or second foot 228. In still another illustrative example, both first end 212 and second end 214 may be connected to feet in plurality of feet 222 that have both a holding component and a functional component.

In movement configuration 276, walking robot 202 may walk across surface 236 of structure 206. Walking robot 202 may walk across surface 236 by alternating between holding a foot against surface 236 and moving the foot relative to surface 236. For example, first end 212 may first move in a direction relative to surface 236. Afterwards, first end 212 may be held relative to surface 236 using holding component 231 of first foot 226. Afterwards, second end 214 may be moved relative to surface 236 in the same direction and towards first end 212. Then, second end 214 may be held relative to surface 236 using holding component 254 or any other desirable holding component. In this way, walking robot 202 may walk across structure 206 in an "inchworm" fashion.

In some illustrative examples, second end 214 may move towards first end 212 and surpass the location of first end 212. In these illustrative examples, the "front" foot of walking robot 202 may alternate as walking robot 202 moves across structure 206. In this illustrative example, walking robot 202 may have a stride similar to an adult human.

In other illustrative examples, walking robot 202 may move in any other desirable fashion. For example, walking robot 202 may do a side wobble similar to a human toddler. In other examples, walking robot 202 may walk in any other desirable fashion.

When walking robot 202 is in functional configuration 278, at least one of first end 212 or second end 214 may be associated with a functional component. For example, in functional configuration 278, first end 212 may be connected to first foot 226 while second end 214 is connected to functional end effector 224. In this illustrative example, second end 214 may release second foot 228 prior to connecting to functional end effector 224. In another illustrative example, in functional configuration 278, second end 214 is connected to third foot 230 with functional component 266. In this illustrative example, second end 214 may not release third foot 230 to perform a function on structure 206.

Although second end 214 is described as being associated with a functional component such as functional end effector 224 or third foot 230 with functional component 266, in some illustrative examples, first end 212 may be connected to a functional component, such as functional end effector 224 or functional end effector 282. In other illustrative examples, both first end 212 and second end 214 may be connected to a functional component. For example, first end 212 may be connected to functional end effector 224 while second end 214 is connected to functional end effector 282.

In functional configuration 278, walking robot 202 may perform a number of functions on structure 206. For example, in functional configuration 278, walking robot 202 may perform a function such as drilling, cutting, trimming, milling, welding, inspecting, remote viewing, sealing, sanding, cleaning, painting, buffing, drying, or any other desirable function on structure 206. For example, functional end effector 224 may be selected from at least one of a drill, a brush, a sander, a cleaning tool, a paint gun, a buffer, a cutting tool, a welding tool, a camera, a probe, or a non-destructive sensor. In some illustrative examples, functional end effector 224 may be referred to as a functional component. As another example, functional end effector 284 may be selected from at least one of a drill, a brush, a sander, a cleaning tool, a paint gun, a buffer, a cutting tool, a welding tool, a camera, a probe, or a non-destructive sensor. In some illustrative examples, functional end effector 284 may be referred to as a functional component.

Walking robot 202 may be one of number of walking robots 280. Number of walking robots 280 may move and work on structure 206 substantially simultaneously. By increasing the quantity of robots in number of walking robots 280, the time to perform functions on structure 206 may decrease. In some illustrative examples, walking robot 202 and another robot of number of walking robots 280 may work in cooperation to perform a function. For example, walking robot 202 and another robot of number of walking robots 280 may be positioned on opposite surfaces of structure 206 to insert and secure a fastener in structure 206. In another example, walking robot 202 and another robot of number of walking robots 280 may be positioned on opposite surfaces of structure 206 to inspect structure 206. In some illustrative examples, walking robot 202 may work in conjunction with a non-walking robot to perform a task on structure 206. For example, walking robot 202 may be positioned on an opposite surface of structure 206 from a non-walking robot to inspect structure 206.

In some illustrative examples, a robot of number of walking robots 280 may support walking robot 202. For example, a robot of walking robots 280 may act as a belay for walking robot 202.

Metrology system 208 may be used to determine and relay the position of number of walking robots 280 on structure 206. In some illustrative examples, metrology system 208 may include a motion capture technology. Number of walking robots 280 may be associated with utilities 210. Utilities 210 may include communications 284, electricity 286, vacuum system 237, hydraulics 287, and pneumatics 288.

Communications 284 may include communications between walking robot 202 and other components within manufacturing environment 200. In some illustrative examples, communications 284 may include communications between robots in number of walking robots 280.

In some illustrative examples, electricity 286 may be used to power functional components to perform functions on structure 206. In some illustrative examples, rather than being connected to electricity 286, walking robot 202 may include a number of batteries. In other illustrative examples, pneumatics 288 or hydraulics 287 may be used to power functional components to perform functions on structure 206.

In some illustrative examples, number of walking robots 280 may be controlled remotely. For example, number of walking robots 280 may be given commands by a human operator. As another example, number of walking robots 280 may be given commands by a computer program. In other illustrative examples, number of walking robots 280 may be autonomous. For example, number of walking robots 280 may communicate with each other and coordinate with each other. For example, number of walking robots 280 may communicate using swarm intelligence.

When walking robot 202 is operating, the end effector of plurality of end effectors 204 connected to first end 212 may be referred to as first end effector 290. First end effector 290 may be any of first foot 226, second foot 228, third foot 230, functional end effector 224, functional end effector 282, or any other end effector of plurality of end effectors 204. When walking robot 202 is operating, the end effector of plurality of end effectors 204 connected to second end 214 may be referred to as second end effector 292. Second end effector 292 may be any of first foot 226, second foot 228, third foot 230, functional end effector 224, functional end effector 282, or any other end effector of plurality of end effectors 204.

The illustration of manufacturing environment 200 in FIG. 2 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of feet 222 may include a fourth foot having both a holding component and a functional component. The fourth foot (not depicted) may be connected to either first end 212 or second end 214.

As another example, functional end effector 224 may be stored in any desirable manner. For example, functional end effector 224 may be held on a trapeze system (not depicted). Second end 214 may connect to functional end effector 224 and remove it from the trapeze (not depicted). In another illustrative example, functional end effector 224 may be held by a holster (not depicted) on second foot 228. After releasing second foot 228, second end 214 may connect to functional end effect 224 and remove it from the holster on second foot 228. In yet another example, functional end effector 224 may be held by a "stork" robot or a crane employed to deliver end effectors to walking robot 202. A "stork" robot may be a long reaching robot that is anchored to an off-structure scaffolding, a floor, or a rail system.

As another example, a holding component, such as holding component 264, holding component 231, or holding component 254, may be a magnetic holding component. In some illustrative examples, a magnetic holding component may function as a clamp on either side of component 239. For example, a magnetic holding component may have a first portion on a first surface of spar 252 and a second portion on a second surface of spar 252.

In another illustrative example, a holding component, such as holding component 264, holding component 231, or holding component 254, may be a magnetic holding component working in conjunction with a magnetic holding component of another robot. For example, a magnetic holding component of a first robot may be on surface 236 of structure 206 and working in conjunction with a magnetic component of a second robot on an opposite surface of structure 206.

Figure 3:
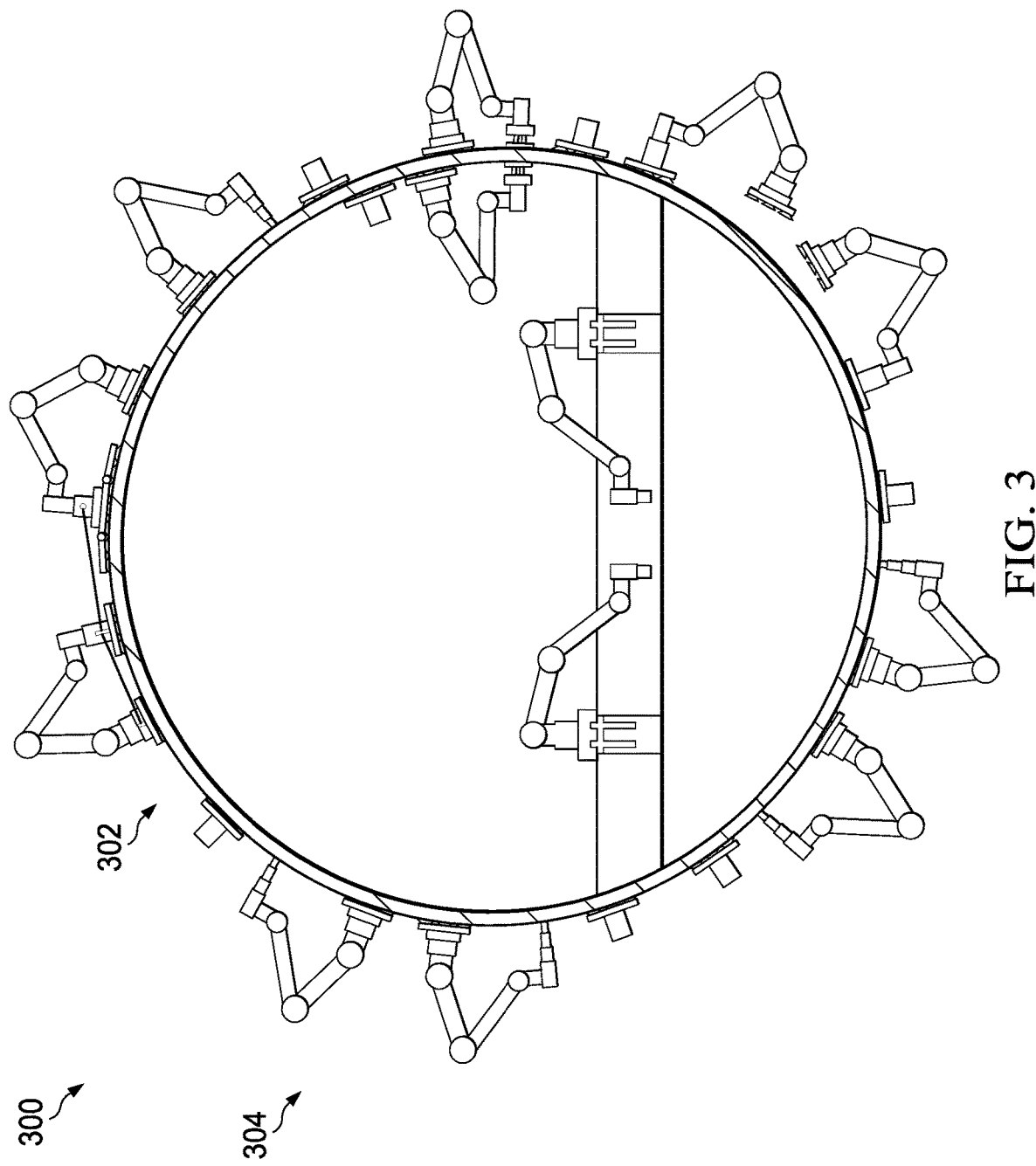
FIG. 3 is an illustration of a cross-sectional view of a manufacturing environment in accordance with an illustrative embodiment.

Turning now to FIG. 3, an illustration of a cross-sectional view of a manufacturing environment is depicted in accordance with an illustrative embodiment. Manufacturing environment 300 may be a physical implementation of manufacturing environment 200 of FIG. 2. Manufacturing environment 300 may be a representation of the manufacturing of aircraft 100 of FIG. 1.

Manufacturing environment 300 may include structure 302 and number of walking robots 304. Number of walking robots 304 may be a physical implementation of number of walking robots 280 of FIG. 2. Number of walking robots 304 may move across structure 302 and perform functions on structure 302. For example, number of walking robots 304 may perform drilling, cutting, trimming, milling, welding, inspecting, remote viewing, sealing, sanding, cleaning, painting, buffing, drying, or any other desirable function on structure 302.

In some illustrative examples, each robot of number of walking robots 304 may be able to perform any of the desirable functions. In other illustrative examples, a robot of number of walking robots 304 may be configured to perform a specific function of the plurality of functions. For example, a robot may be configured to perform a specific function by having a desirable size, weight, or number of joints to perform the specific function.

Figure 4:
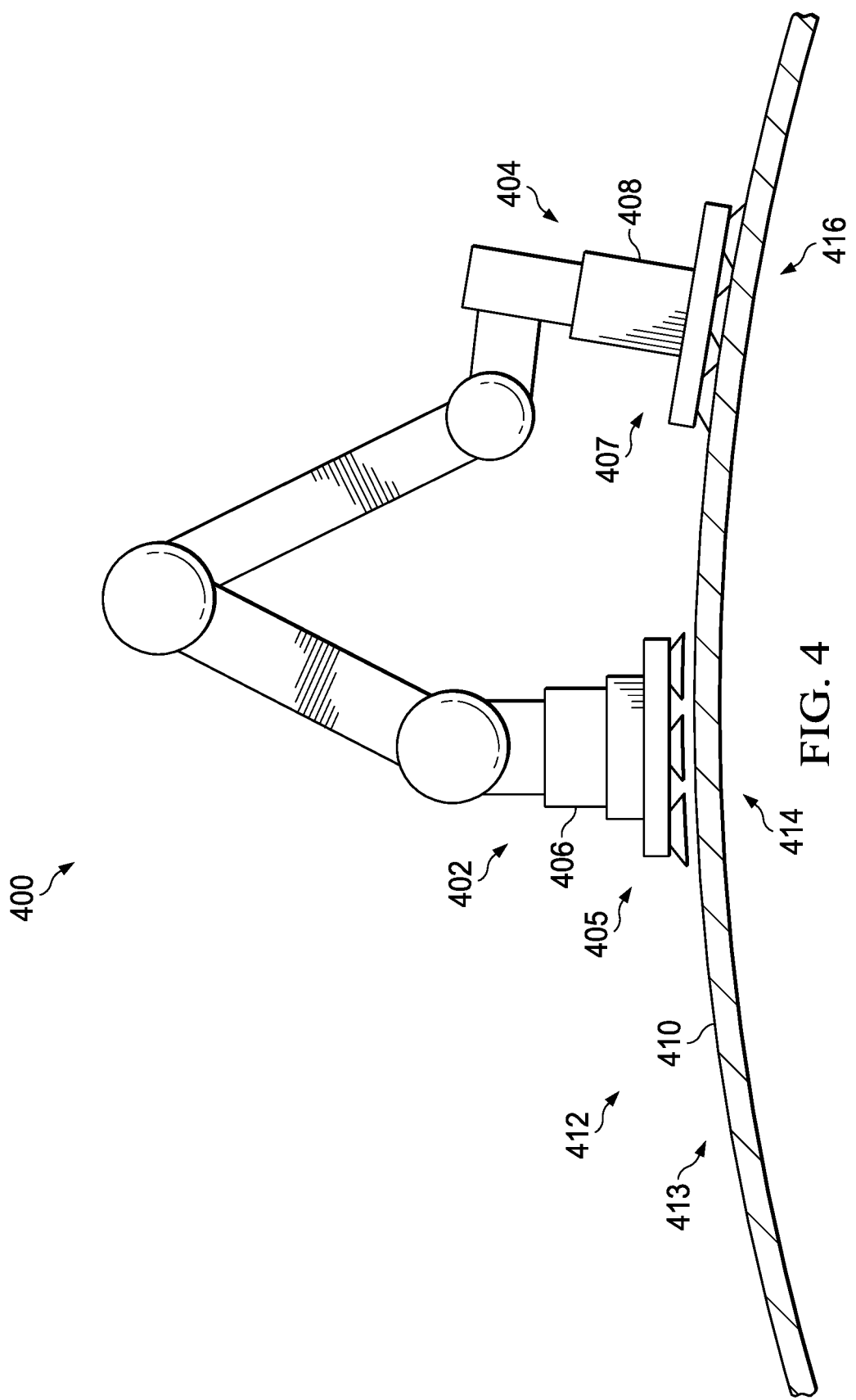
FIG. 4 is an illustration of a walking robot moving across a structure in accordance with an illustrative embodiment.

Turning now to FIG. 4, an illustration of a walking robot moving across a structure is depicted in accordance with an illustrative embodiment. Walking robot 400 may be a physical implementation of walking robot 202 of FIG. 2. Walking robot 400 may be one robot of number of walking robots 304 of FIG. 3.

Walking robot 400 may have first end 402 and second end 404. First end effector 405 may be connected to first end 402. First end effector 405 may take the form of first foot 406. First foot 406 may be a physical implementation of first foot 226 of FIG. 2.

Second end effector 407 may be connected to second end 404. Second end effector 407 may take the form of second foot 408. As depicted, first foot 406 and second foot 408 may contact surface 410 of structure 412. Although surface 410 of structure 412 is depicted as curved 413, surface 410 may have any desirable shape. For example, surface 410 may include planar sections, angled sections, facets, divots, ridges, or any combination thereof.

First foot 406 and second foot 408 may enable walking robot 400 to walk across structure 412. In this depicted example, first foot 406 may contact surface 410 at location 414. Second foot 408 may contact surface 410 at location 416.

Figure 5:
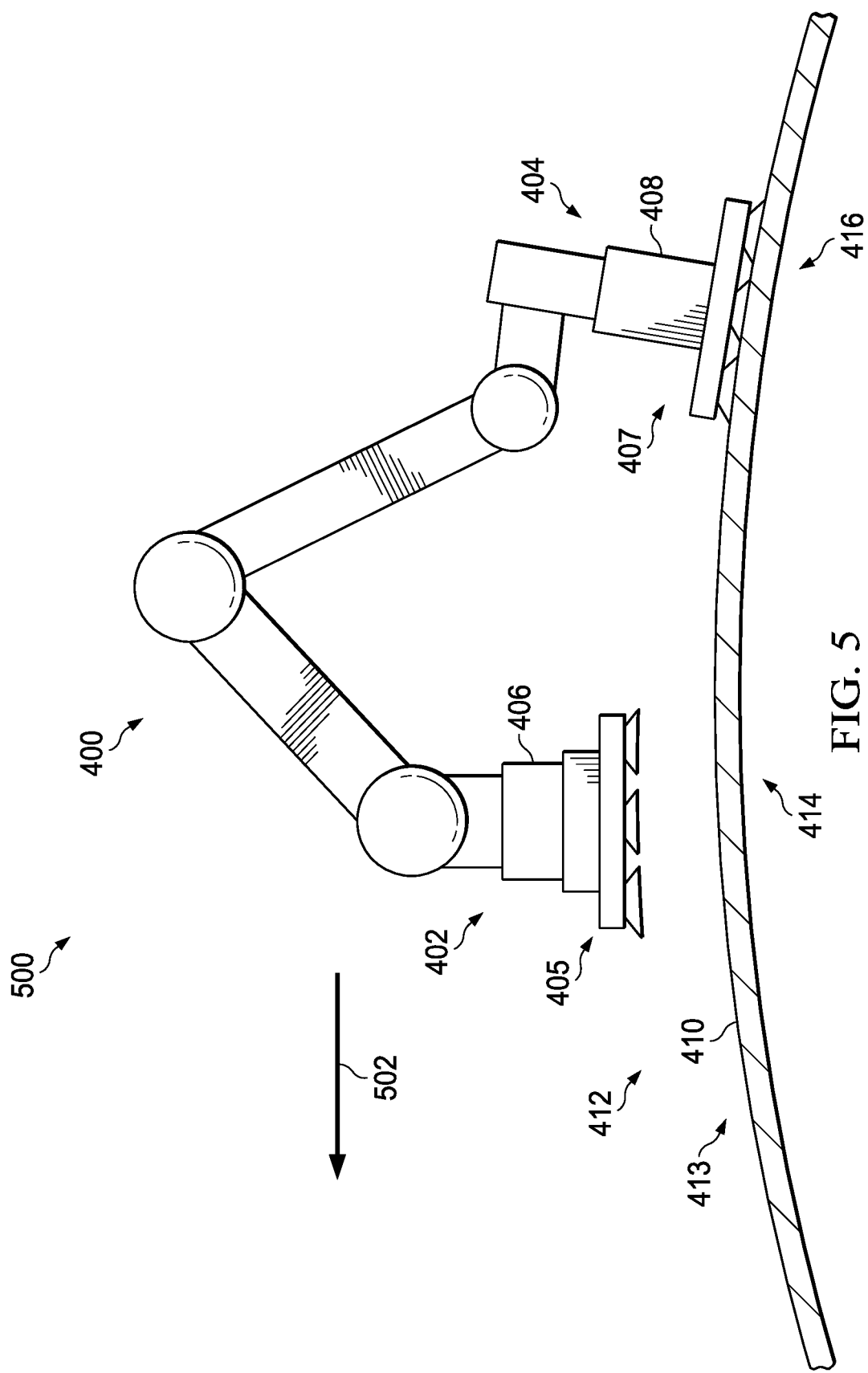
FIG. 5 is an illustration of a walking robot moving across a structure in accordance with an illustrative embodiment.

Turning now to FIG. 5, an illustration of a walking robot moving across a structure is depicted in accordance with an illustrative embodiment. View 500 may be a view of walking robot 400 as walking robot 400 walks across structure 412. In view 500, first foot 406 does not contact surface 410 of structure 412. In view 500, first foot 406 may have moved relative to surface 410 of structure 412 from FIG. 4. Further, in view 500, first foot 406 may be moving in direction 502 away from second foot 408.

Figure 6:
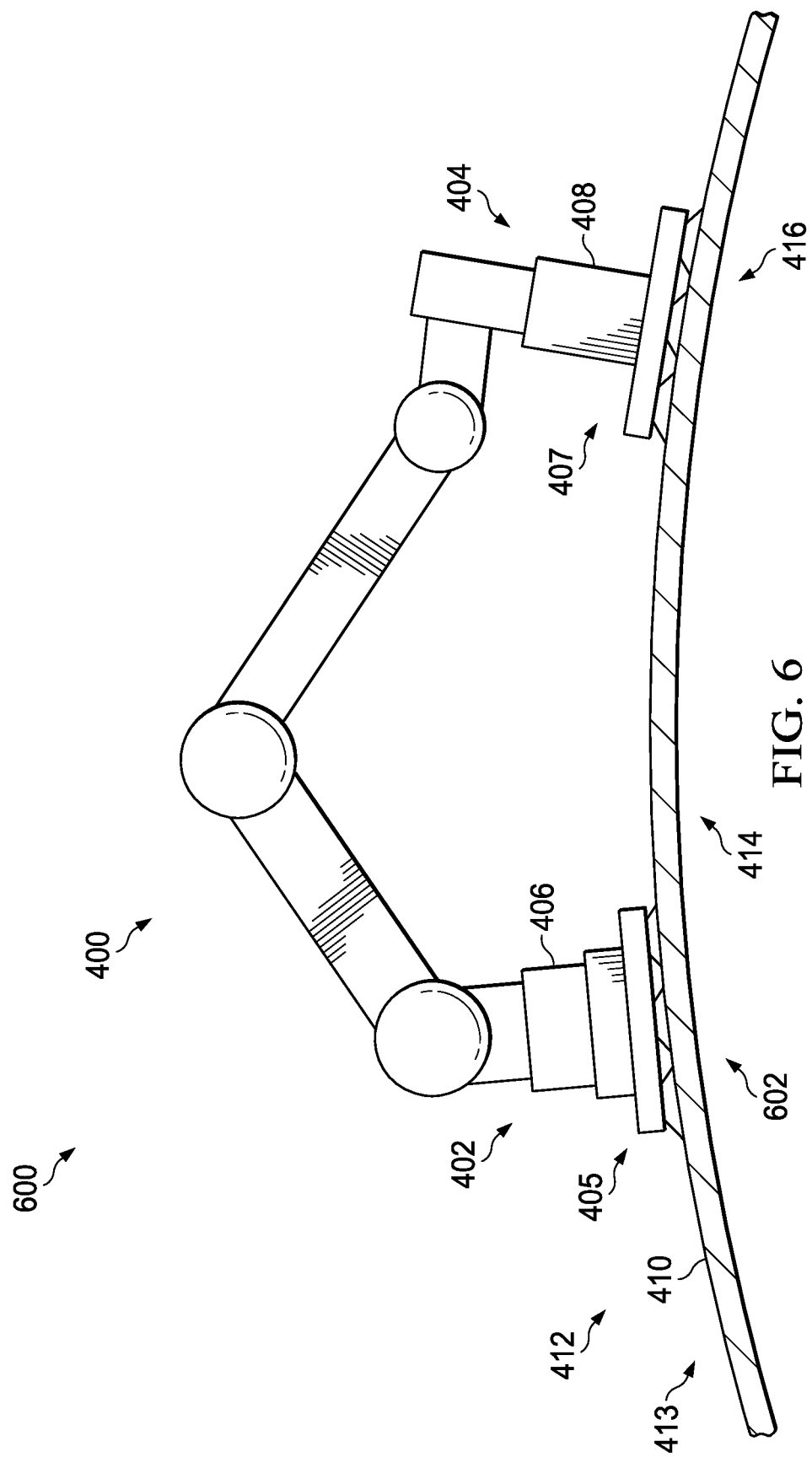
FIG. 6 is an illustration of a walking robot moving across a structure in accordance with an illustrative embodiment.

Turning now to FIG. 6, an illustration of a walking robot moving across a structure is depicted in accordance with an illustrative embodiment. View 600 may be a view of walking robot 400 as walking robot 400 walks across structure 412. In view 600, first foot 406 and second foot 408 may both contact surface 410 of structure 412.

In view 600, second foot 408 may still contact location 416. First foot 406 may contact location 602 of surface 410 of structure 412.

Location 414 may be between location 602 and location 416. First foot 406 may have moved from location 414 to location 602 in FIGS. 4-6.

Figure 7:
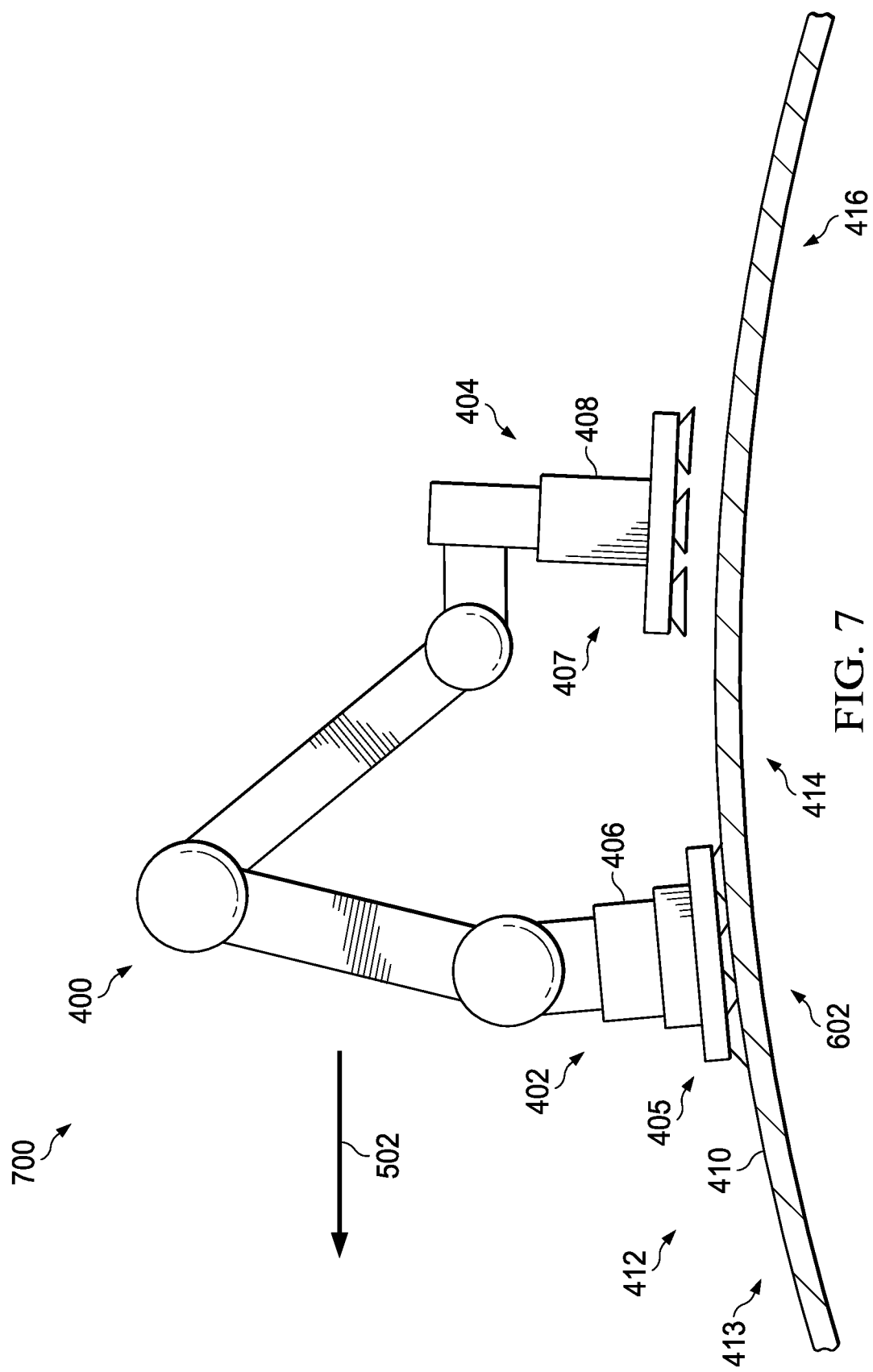
FIG. 7 is an illustration of a walking robot moving across a structure in accordance with an illustrative embodiment.

Turning now to FIG. 7, an illustration of a walking robot moving across a structure is depicted in accordance with an illustrative embodiment. View 700 may be a view of walking robot 400 as walking robot 400 walks across structure 412. In view 700, second foot 408 may not contact surface 410 of structure 412. In view 700, second foot 408 may have moved relative to surface 410 of structure 412. Further, in view 700 second foot 408 may be moving in direction 502 towards first foot 406.

Figure 8:
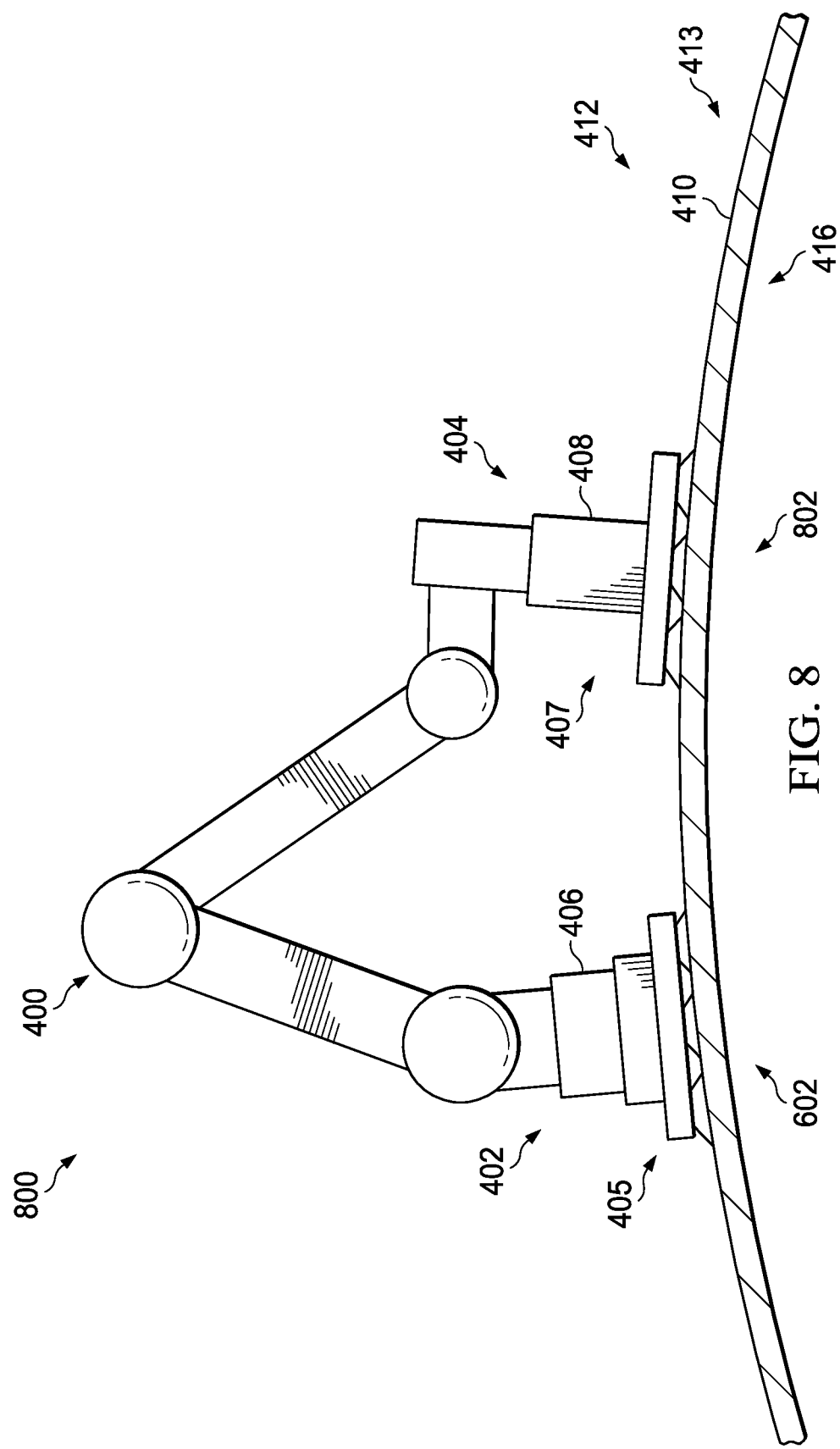
FIG. 8 is an illustration of a walking robot moving across a structure in accordance with an illustrative embodiment.

Turning now to FIG. 8, an illustration of a walking robot moving across a structure is depicted in accordance with an illustrative embodiment. View 800 may be a view of walking robot 400 as walking robot 400 walks across structure 412. In view 800, first foot 406 and second foot 408 may both contact surface 410 of structure 412.

First foot 406 may contact surface 410 at location 602. Second foot 408 may contact surface 410 at location 802. Location 802 may be closer to location 602 than location 416.

Figure 9:
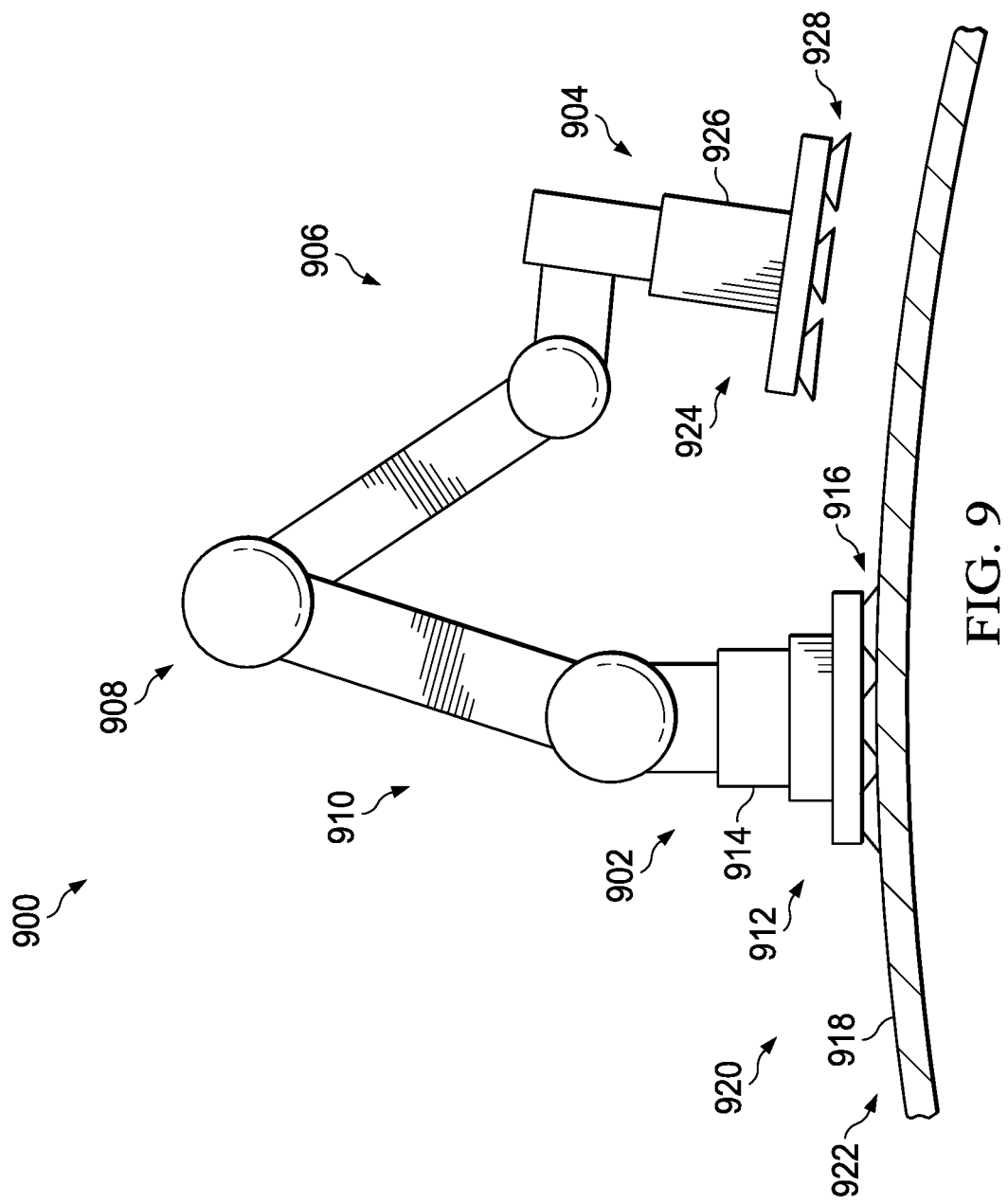
FIG. 9 is an illustration of a walking robot in a movement configuration in accordance with an illustrative embodiment.

Turning now to FIG. 9, an illustration of a walking robot in a movement configuration is depicted in accordance with an illustrative embodiment. Walking robot 900 may be a physical implementation of walking robot 202 of FIG. 2. In some illustrative examples, walking robot 400 may be the same as walking robot 900.

Walking robot 900 may have first end 902, second end 904, and plurality of joints 906. Plurality of joints 906 may allow first end 902 and second end 904 to move within a plurality of axes (not depicted).

In this illustrative example, walking robot 900 may be robotic arm 908. Robotic arm 908 may be a traditional pedestal type robot 910 meeting desired specifications. Desired specifications for pedestal type robot 910 may include at least one of a desirable weight, a desirable length, a desirable width, a desirable height, a desirable quantity of joints, a desirable working load capacity, or a desirable type of joints.

First end effector 912 may be connected to first end 902. As depicted, first end effector 912 may take the form of first foot 914. First foot 914 may have plurality of suction cups 916. Plurality of suction cups 916 may hold first foot 914 on surface 918 of structure 920. In some illustrative examples, a vacuum source (not depicted) may supply a vacuum to plurality of suction cups 916 to hold first foot 914 on surface 918 of structure 920.

Although surface 918 of structure 920 is depicted as curved 922, surface 918 may have any desirable shape. For example, surface 918 may include planar sections, angled sections, facets, divots, ridges, or any combination thereof.

Second end effector 924 may be connected to second end 904. As depicted, second end effector 924 may take the form of second foot 926. Second foot 926 may have plurality of suction cups 928. Plurality of suction cups 928 may hold second foot 926 on surface 918 of structure 920. In some illustrative examples, a vacuum source (not depicted), may supply a vacuum to plurality of suction cups 928 to hold second foot 926 on surface 918 of structure 920.

Figure 10:
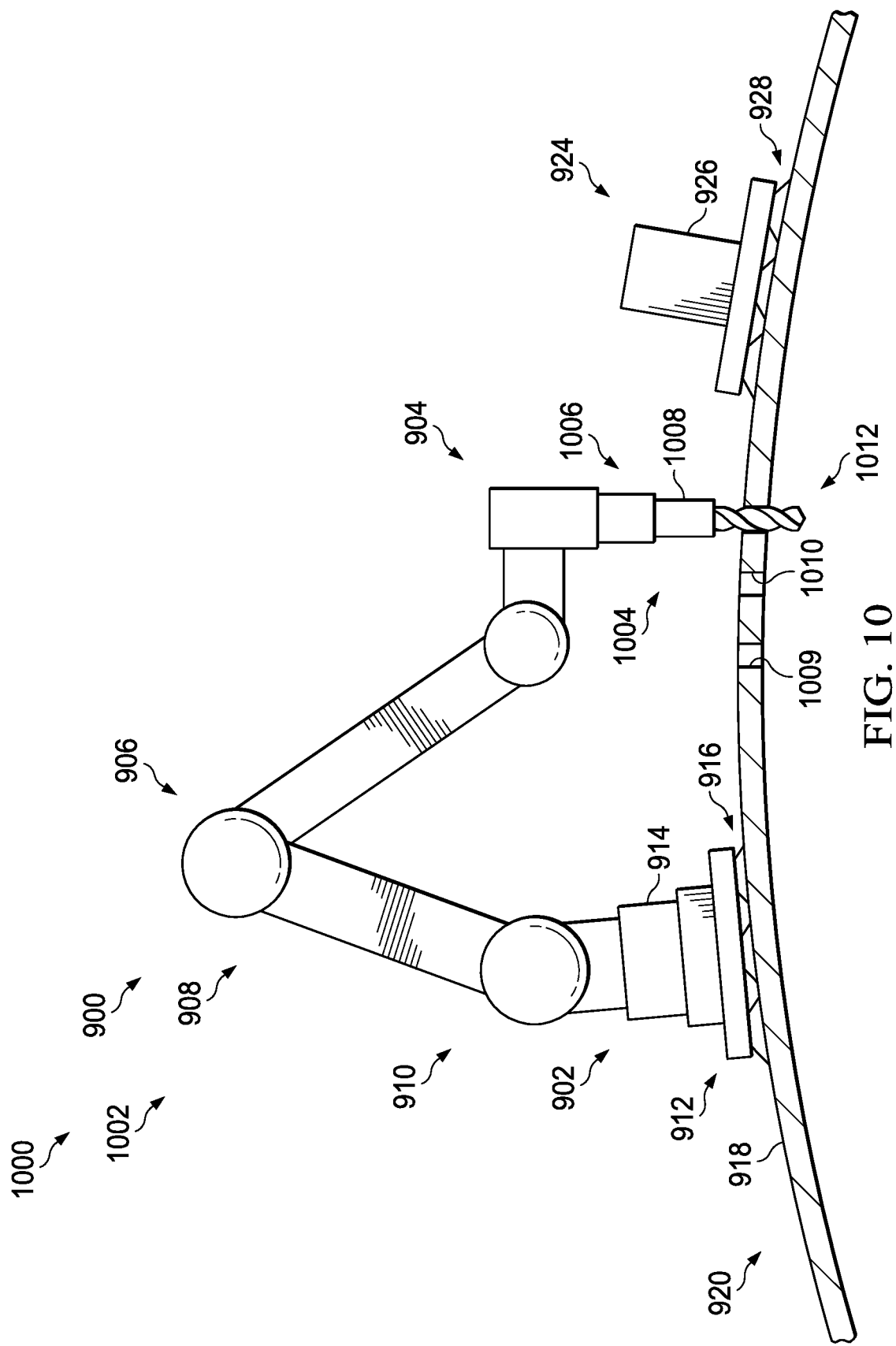
FIG. 10 is an illustration of a walking robot in a functional configuration in accordance with an illustrative embodiment.

Turning now to FIG. 10, an illustration of a walking robot in a functional configuration is depicted in accordance with an illustrative embodiment. View 1000 may be a view of walking robot 900 in functional configuration 1002. In functional configuration 1002, second end 904 of walking robot 900 may be connected to end effector 1004. End effector 1004 may be functional component 1006. In this illustrative example, functional component 1006 may be drill 1008. In other illustrative examples, functional component 1006 may be an end effector configured to perform any desirable function such as inspecting, sealing, sanding, cleaning, painting, buffing, drying, or any other desirable function.

Second foot 926 may no longer be connected to second end 904 of walking robot 900. As depicted, second foot 926 may be held to surface 918 of structure 920 by plurality of suction cups 928.

Walking robot 900 may have released second foot 926 after second foot 926 was held to surface 918. Afterwards, walking robot 900 may have connected second end 904 to end effector 1004.

Prior to being connected to second end 904 of walking robot 900, end effector 1004 may have been held by any desirable component. For example, end effector 1004 may have been held in a holster (not depicted) of second foot 926. As another example, end effector 1004 may have been held by a trapeze system (not depicted) about structure 920. The trapeze system may be a separate structure elevated above the work surface. In some illustrative examples, end effector 1004 may be carried by another walking robot on structure 920. In other examples, end effector 1004 may be held by a "stork" robot or a crane employed to deliver end effectors to walking robot 900. A "stork" robot may be a long reaching robot that is anchored to an off-structure scaffolding, a floor, or a rail system. Walking robot 900 may perform functions on structure 920 using end effector 1004. After performing functions on desirable locations, such as location 1009 location 1010, and location 1012, second end 904 of walking robot 900 may release end effector 1004. After releasing end effector 1004, second end 904 of walking robot 900 may be connected to second foot 926. Walking robot 900 may then walk across structure 920 to another desirable location to perform a function.

Figure 11:
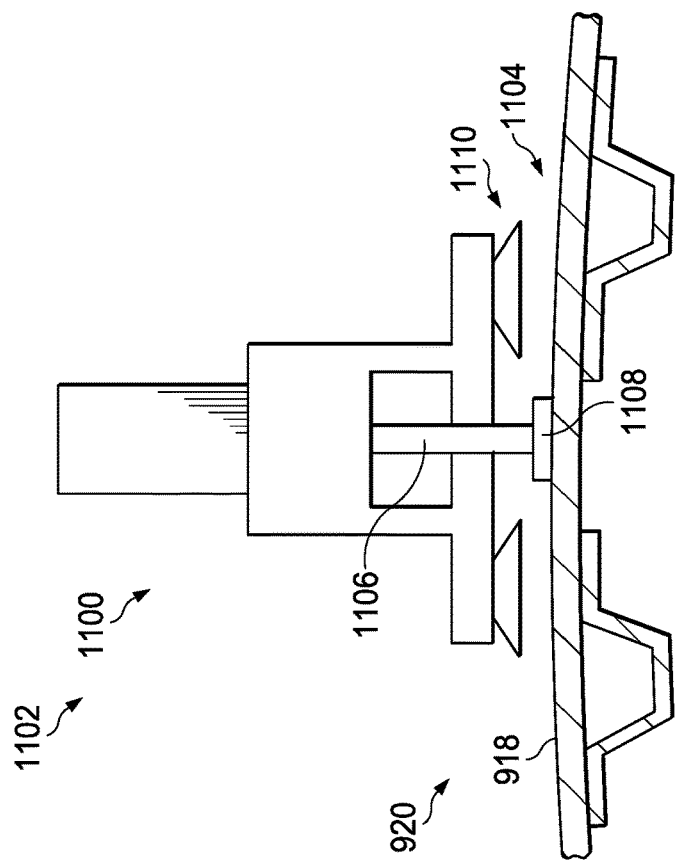
FIG. 11 is an illustration of a foot of a walking robot having a functional component in accordance with an illustrative embodiment.

Turning now to FIG. 11, an illustration of a foot of a walking robot having a functional component is depicted in accordance with an illustrative embodiment. Foot 1100 may be a physical implementation of second foot 228 of FIG. 2. Foot 1100 of view 1102 may be an alternative end effector to second foot 926 of FIGS. 9 and 10. Foot 1100 may include functional component 1104. If foot 1100 is connected to second end 904 of walking robot 900, foot 1100 may remain connected to second end 904 as functional component 1104 performs a function on structure 920. To perform a function on structure 920 in FIG. 10, second foot 926 was removed. Performing functions with walking robot 900 and foot 1100 may have a reduced time spent changing end effectors compared to using walking robot 900 with second foot 926. Using foot 1100 rather than second foot 926 may reduce a time to perform functions on structure 920. However, second foot 926 of FIGS. 9 and 10 may be lighter than foot 1100.

In this illustrative example, functional component 1104 may be sensor 1106. In some examples, functional component 1104 may be non-destructive inspection component 1108.

As depicted, functional component 1104 may contact surface 918 of structure 920. Plurality of suction cups 1110 of foot 1100 may not contact surface 918 of structure 920 when functional component 1104 contacts surface 918 of structure 920.

Figure 12:
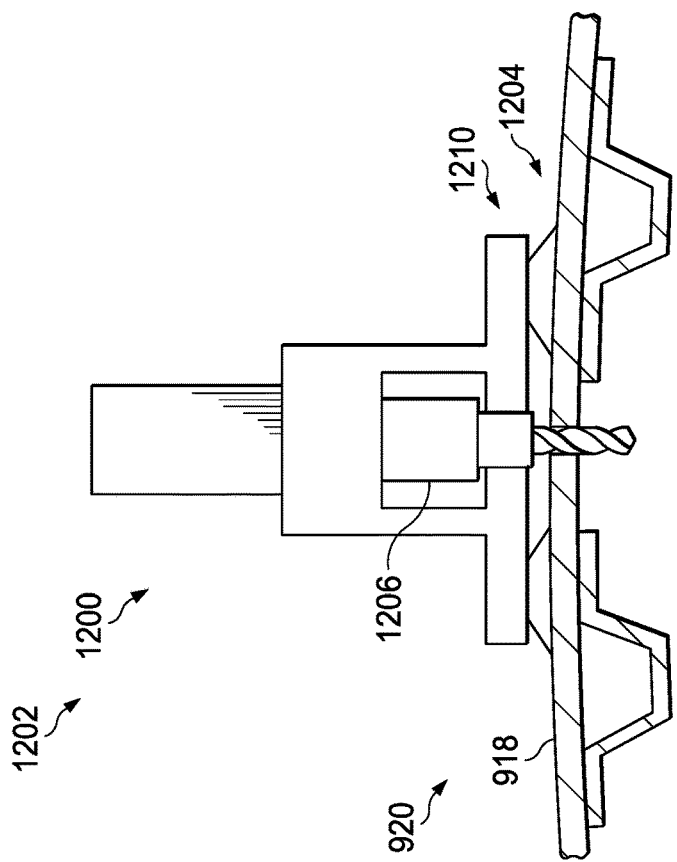
FIG. 12 is an illustration of a foot of a walking robot having a functional component in accordance with an illustrative embodiment.

Turning now to FIG. 12, an illustration of a foot of a walking robot having a functional component is depicted in accordance with an illustrative embodiment. Foot 1200 may be a physical implementation of second foot 228 of FIG. 2. Foot 1200 of view 1202 may be an alternative end effector to second foot 926 of FIGS. 9 and 10. Foot 1200 may include functional component 1204.

If foot 1200 is connected to second end 904 of walking robot 900, foot 1200 may remain connected to second end 904 as functional component 1204 performs a function on structure 920. To perform a function on structure 920 in FIG. 10, second foot 926 was removed. Performing functions with walking robot 900 and foot 1200 may have a reduced time spent changing end effectors compared to using walking robot 900 with second foot 926. Using foot 1200 rather than second foot 926 may reduce a time to perform functions on structure 920. However, second foot 926 of FIGS. 9 and 10 may be lighter than foot 1200.

In this illustrative example, functional component 1204 may be drill 1206. In other illustrative examples, functional component 1204 may be an end effector configured to perform any desirable function such as inspecting, sealing, sanding, cleaning, painting, buffing, drying, or any other desirable function.

As depicted, functional component 1204 may drill through surface 918 of structure 920. Plurality of suction cups 1210 of foot 1200 may hold foot 1200 on surface 918 of structure 920 when functional component 1204 performs a function on structure 920. Plurality of suction cups 1210 may provide stability for functional component 1204 as functional component 1204 performs a function on structure 920.

Turning now to FIG. 13, an illustration of a walking robot having a number of conformal suction feet is depicted in accordance with an illustrative embodiment. Walking robot 1300 may be a physical implementation of walking robot 202 of FIG. 2. In some illustrative examples, walking robot 1300 may be similar to walking robot 400 but with different end effectors.

Walking robot 1300 may have first end 1302, second end 1304, and plurality of joints 1306. Plurality of joints 1306 may allow first end 1302 and second end 1304 to move within a plurality of axes.

In this illustrative example, walking robot 1300 may be robotic arm 1308. Robotic arm 1308 may be a traditional pedestal type robot 1310 meeting desired specifications. Desired specifications for pedestal type robot 1310 may include at least one of a desirable weight, a desirable length, a desirable width, a desirable height, a desirable quantity of joints, a desirable working load capacity, or a desirable type of joints.

First end effector 1312 may be connected to first end 1302. As depicted, first end effector 1312 may take the form of first foot 1314. First foot 1314 may be conformal suction foot 1316. In some illustrative examples, a vacuum source (not depicted) may supply a vacuum to conformal suction foot 1316 to hold first foot 1314 on surface 1318 of structure 1320.

In this illustrative example, structure 1320 may include hat-shaped stringer 1322, hat-shaped stringer 1324, and hat-shaped stringer 1326. Conformal suction foot 1316 may be configured to contact at least one of hat-shaped stringer 1322, hat-shaped stringer 1324, or hat-shaped stringer 1326. As depicted, conformal suction foot 1316 may contact surface 1318 of hat-shaped stringer 1322.

Second end effector 1328 may be connected to second end 1304. As depicted, second end effector 1328 may take the form of second foot 1330. Second foot 1330 may be conformal suction foot 1332. In some illustrative examples, a vacuum source (not depicted) may supply a vacuum to conformal suction foot 1332 to hold second foot 1330 on surface 1334 of structure 1320. As depicted, conformal suction foot 1332 may contact surface 1334 of hat-shaped stringer 1326.

Turning now to FIG. 14, an illustration of a conformal suction foot of a walking robot is depicted in accordance with an illustrative embodiment. View 1400 may be a view of conformal suction foot 1316 within the box labeled FIG. 14 in FIG. 13. Conformal suction foot 1316 may include slider attach point 1402, pivot attach point 1404, semi-rigid seal plate 1406, and vacuum seal 1408. Slider attach point 1402 and pivot attach point 1404 may allow semi-rigid seal plate 1406 to move relative to the base of conformal suction foot 1316. Slider attach point 1402 and pivot attach point 1404 may provide some tolerance between second end 1304 of walking robot 1300 and hat-shaped stringer 1322.

Semi-rigid seal plate 1406 may be conformal to hat-shaped stringer 1322. In some illustrative examples, semi-rigid seal plate 1406 may be a semi-flexible plate that partially conforms to an uneven substructure such as hat-shaped stringer 1322. A vacuum may be provided to vacuum seal 1408 from a vacuum source (not shown). When a vacuum is applied to vacuum seal 1408, conformal suction foot 1316 may be held against hat-shaped stringer 1322.

Figure 15:
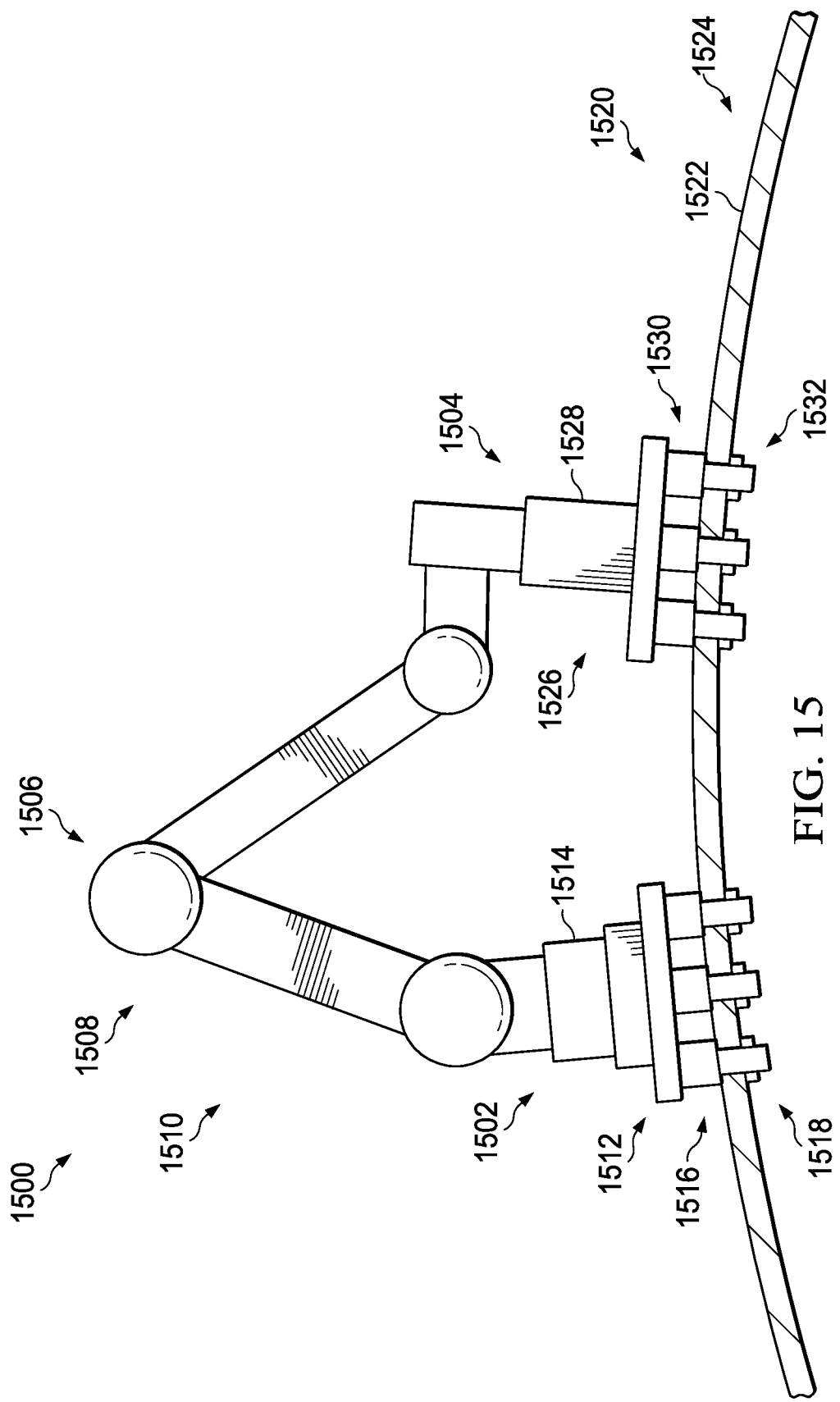
FIG. 15 is an illustration of a walking robot having a number of feet with locking pins in accordance with an illustrative embodiment.

Turning now to FIG. 15, an illustration of a walking robot having a number of feet with locking pins is depicted in accordance with an illustrative embodiment. Walking robot 1500 may be a physical implementation of walking robot 202 of FIG. 2. In some illustrative examples, walking robot 1500 may be similar to walking robot 400, but with different end effectors.

Walking robot 1500 may have first end 1502, second end 1504, and plurality of joints 1506. Plurality of joints 1506 may allow first end 1502 and second end 1504 to move within a plurality of axes.

In this illustrative example, walking robot 1500 may be robotic arm 1508. Robotic arm 1508 may be a traditional pedestal type robot 1510 meeting desired specifications. Desired specifications for pedestal type robot 1510 may include at least one of a desirable weight, a desirable length, a desirable width, a desirable height, a desirable quantity of joints, a desirable working load capacity, or a desirable type of joints.

First end effector 1512 may be connected to first end 1502. As depicted, first end effector 1512 may take the form of first foot 1514. First foot 1514 may include locking pins 1516. Locking pins 1516 may extend through holes 1518 in structure 1520. By extending through holes 1518 in structure 1520, locking pins 1516 may hold first foot 1514 relative to structure 1520.

Although surface 1522 of structure 1520 is depicted as curved 1524, surface 1522 may have any desirable shape. For example, surface 1522 may include planar sections, angled sections, facets, divots, ridges, or any combination thereof.

Second end effector 1526 may be connected to second end 1504. As depicted, second end effector 1526 may take the form of second foot 1528. Second foot 1528 may include locking pins 1530. Locking pins 1530 may extend through holes 1532 in structure 1520. By extending through holes 1532 in structure 1520, locking pins 1530 may hold second foot 1528 relative to structure 1520.

Although locking pins 1516 and locking pins 1530 are depicted as a plurality of locking pins, in some illustrative examples, at least one of locking pins 1516 or locking pins 1530 may have more or less locking pins than depicted. In some illustrative examples, at least one of locking pins 1516 or locking pins 1530 may have only one locking pin.

Figure 16:
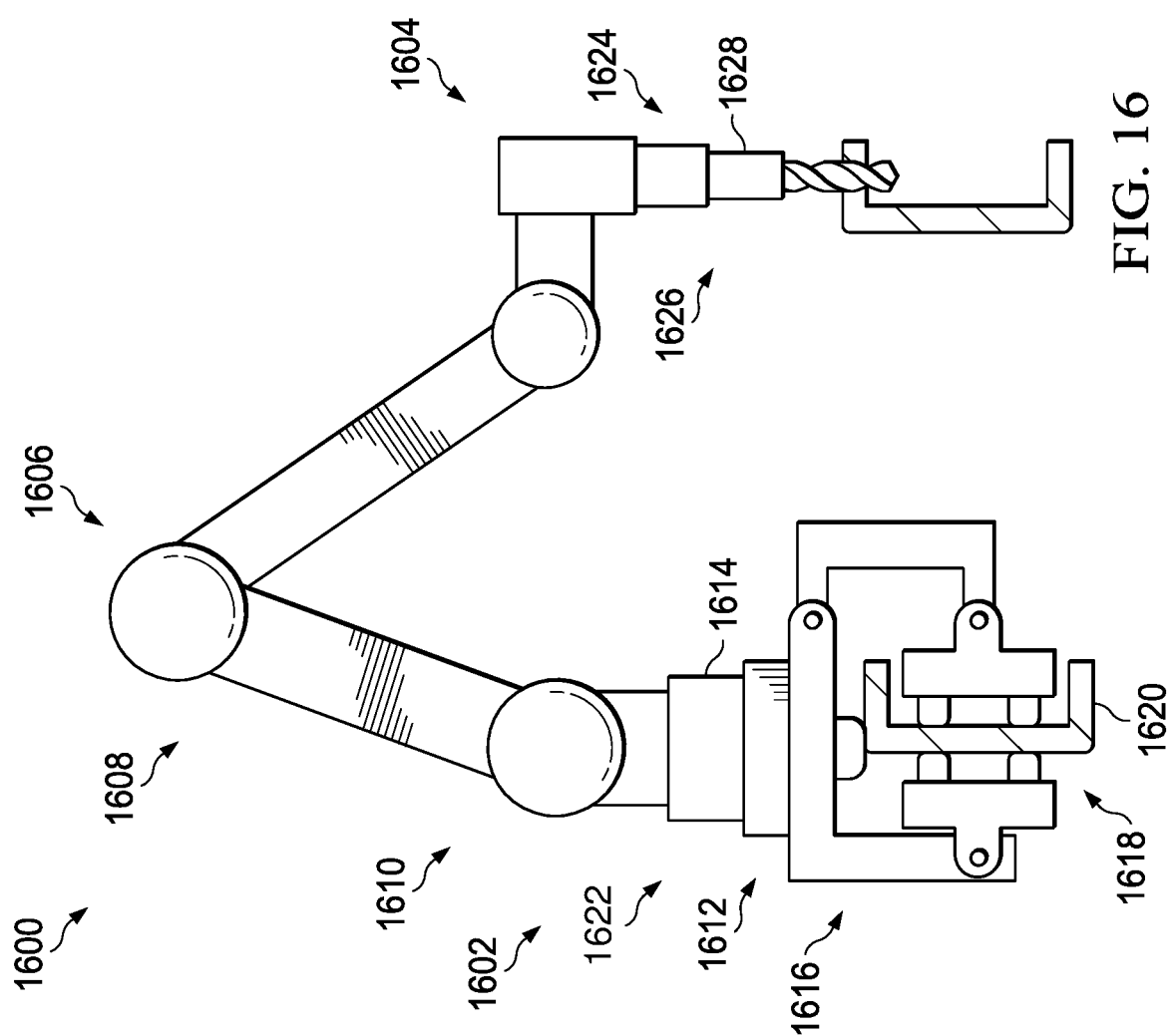
FIG. 16 is an illustration of a walking robot performing a function on a beam in accordance with an illustrative embodiment.

Turning now to FIG. 16, an illustration of a walking robot performing a function on a beam is depicted in accordance with an illustrative embodiment. Walking robot 1600 may be a physical implementation of walking robot 202 of FIG. 2. In some illustrative examples, walking robot 1600 may be similar to walking robot 400, but with different end effectors.

Walking robot 1600 may have first end 1602, second end 1604, and plurality of joints 1606. Plurality of joints 1606 may allow first end 1602 and second end 1604 to move within a plurality of axes.

In this illustrative example, walking robot 1600 may be robotic arm 1608. Robotic arm 1608 may be a traditional pedestal type robot 1610 meeting desired specifications. Desired specifications for pedestal type robot 1610 may include at least one of a desirable weight, a desirable length, a desirable width, a desirable height, a desirable quantity of joints, a desirable working load capacity, or a desirable type of joints.

First end effector 1612 may be connected to first end 1602. As depicted, first end effector 1612 may take the form of first foot 1614. First foot 1614 may include component gripper 1616. Component gripper 1616 may hold first foot 1614 relative to structure 1618. As depicted, structure 1618 may be spar 1620.

As depicted, walking robot 1600 may be in functional configuration 1622. Second end 1604 of walking robot 1600 may be connected to second end effector 1624. Second end effector 1624 may be functional component 1626. In this illustrative example, functional component 1626 may be drill 1628. In other illustrative examples, functional component 1626 may be an end effector configured to perform any desirable function such as inspecting, sealing, sanding, cleaning, painting, buffing, drying, or any other desirable function.

Prior to being connected to second end 1604 of walking robot 1600, second end effector 1624 may have been held by any desirable component. For example, second end effector 1624 may have been held in a holster (not depicted) of a second foot (not depicted). As another example, second end effector 1624 may have been held by a trapeze system (not depicted) about spar 1620.

To move along spar 1620, second end effector 1624 may be removed from second end 1604. Afterwards, a second foot (not depicted) may be connected to second end 1604. Walking robot 1600 may walk along spar 1620 by alternatingly releasing then moving component gripper 1616 or a component gripper (not depicted) of second foot (not depicted).

For example, component gripper 1616 may be released and moved relative to spar 1620 while a component gripper (not depicted) of second foot (not depicted) is clamped onto spar 1620. Afterwards, component gripper 1616 may clamp onto spar 1620. After clamping component gripper 1616 onto spar 1620, the component gripper (not depicted) of second foot (not depicted) may be released and moved relative to spar 1620.

Figure 17:
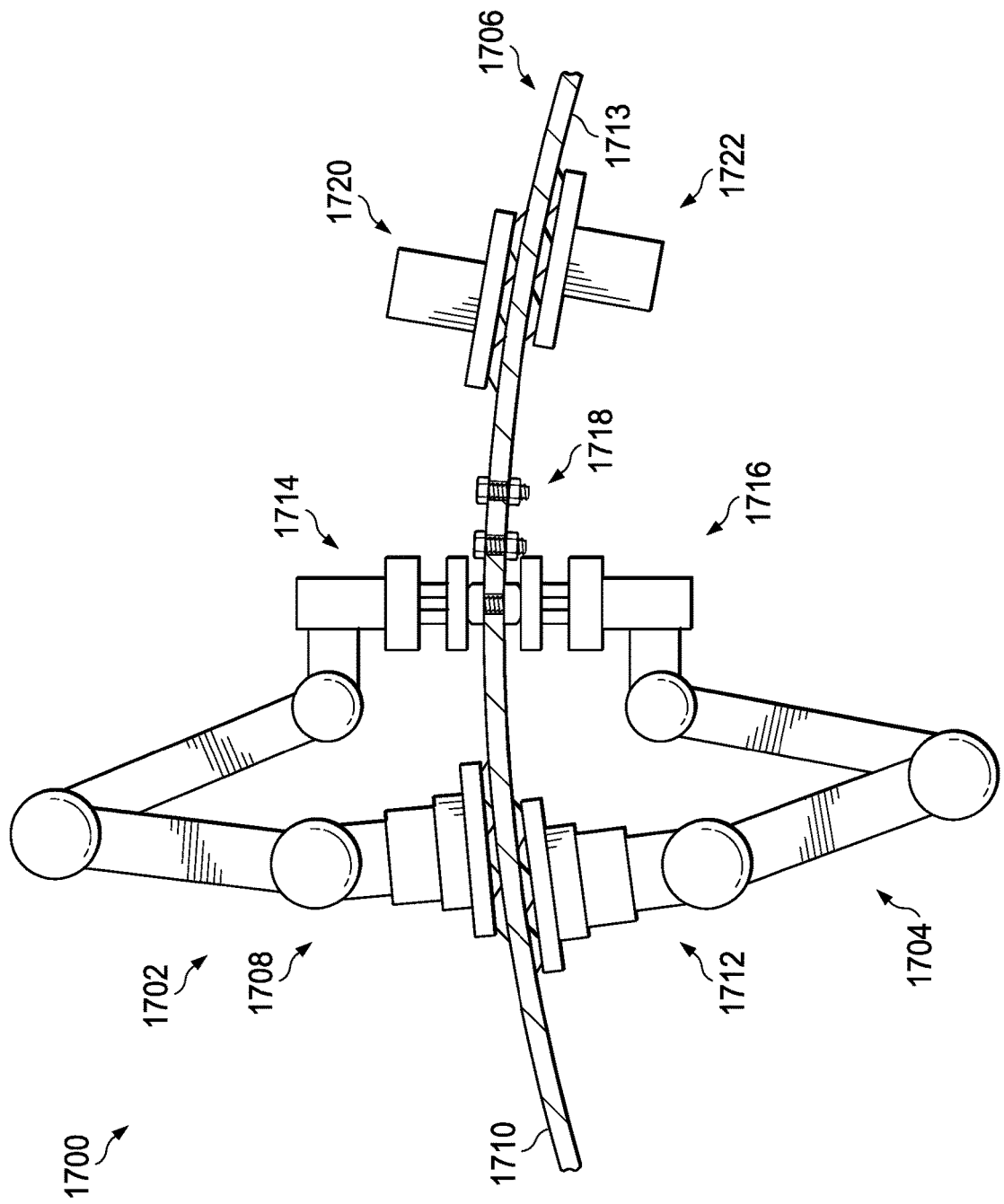
FIG. 17 is an illustration of a pair of walking robots performing a function on a structure in accordance with an illustrative embodiment.

Turning now to FIG. 17, an illustration of a pair of walking robots performing a function on a structure is depicted in accordance with an illustrative embodiment. Manufacturing environment 1700 may be a physical implementation of manufacturing environment 200 of FIG. 2. Manufacturing environment 1700 includes first walking robot 1702, second walking robot 1704, and structure 1706. First walking robot 1702 and second walking robot 1704 may be physical implementations of walking robot 202 of FIG. 2. First walking robot 1702 and second walking robot 1704 may be substantially the same as walking robot 900.

First foot 1708 of walking robot 1702 may hold walking robot 1702 on surface 1710 of structure 1706. First foot 1712 of walking robot 1704 may hold walking robot 1704 on surface 1713 of structure 1706. Surface 1710 may be opposite of surface 1713. For example, surface 1710 may be referred to as an outer surface, while surface 1713 may be referred to an as inner surface.

Walking robot 1702 may be connected to functional component 1714. Walking robot 1704 may be connected to functional component 1716. Functional component 1714 and functional component 1716 may work in conjunction to install fasteners 1718.

After installing fasteners 1718, walking robot 1702 may release functional component 1714 and connect to second foot 1720. After installing fasteners 1718, walking robot 1704 may release functional component 1716 and connect to second foot 1722.

Although FIG. 17 may depict a fastener installation process, walking robots such as walking robot 1702 and walking robot 1704 may be used in conjunction with each other to perform any desirable task. For example, walking robots, such as walking robot 1702 and walking robot 1704, may be used to provide inspection techniques, such as transmission ultrasound (TTU) or x-radiography. In these examples, one of walking robot 1702 or walking robot 1704 may hold a signal transmitting device while the other of walking robot 1702 or walking robot 1704 may hold a sensor.

Figure 18:
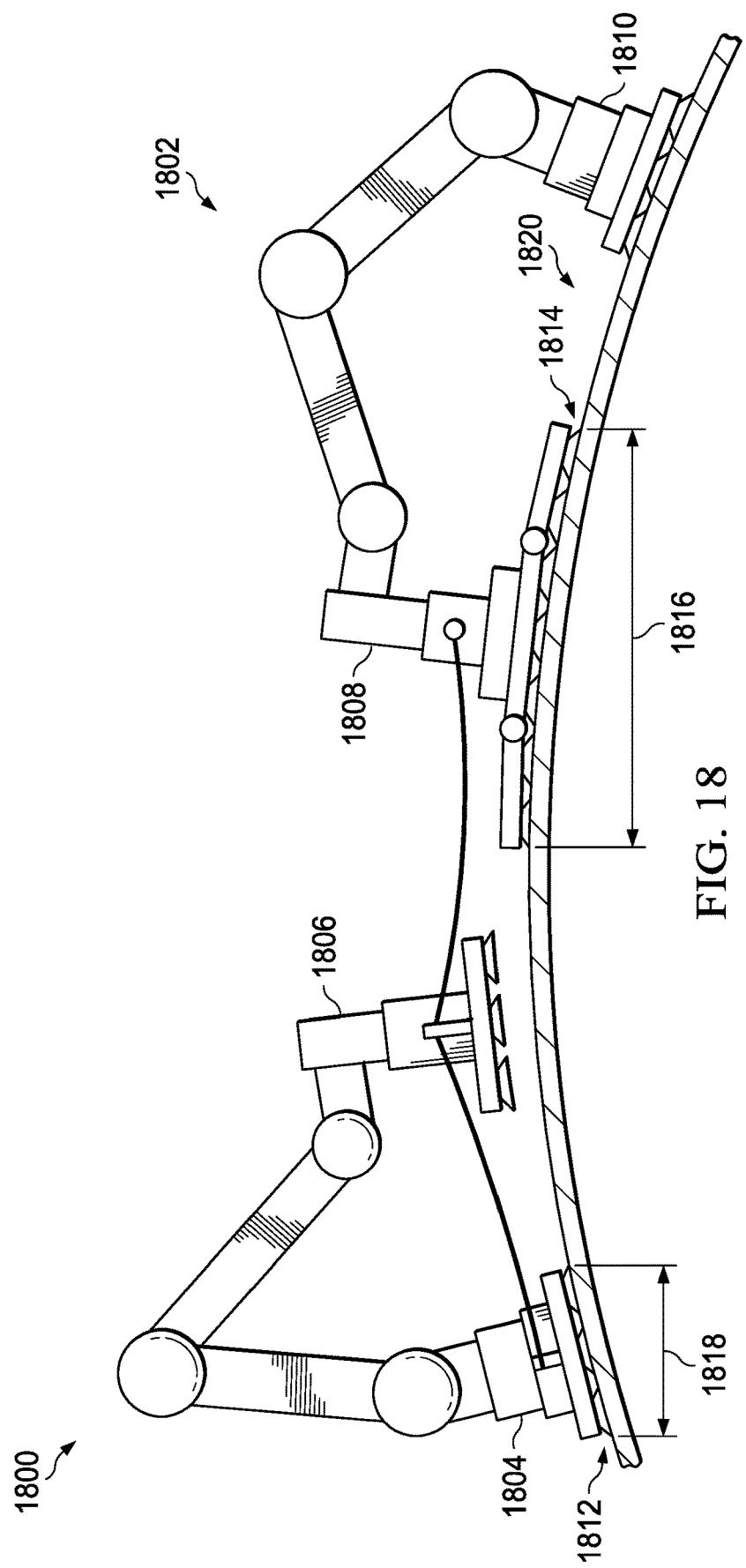
FIG. 18 is an illustration of a pair of walking robots working in tandem in accordance with an illustrative embodiment.

Turning now to FIG. 18, an illustration of a pair of walking robots working in tandem is depicted in accordance with an illustrative embodiment. First walking robot 1800 and second walking robot 1802 may be physical implementations of walking robot 202 of FIG. 2. First walking robot 1800 may be substantially similar to at least one of walking robot 400 and walking robot 900.

First walking robot 1800 may be connected to first foot 1804 and second foot 1806. Second walking robot 1802 may be connected to first foot 1808 and second foot 1810. First foot 1804 may have plurality of suction cups 1812. First foot 1808 may have plurality of suction cups 1814. Plurality of suction cups 1814 may have a greater quantity of suction cups than plurality of suction cups 1812. Width 1816 of first foot 1808 may be greater than width 1818 of first foot 1804.

Second walking robot 1802, including first foot 1808 and second foot 1810, may catch first walking robot 1800 if first walking robot 1800 were to fall. Width 1816 may provide greater stability than width 1818 of first foot 1804. Second walking robot 1802 and first walking robot 1800 may move across structure 1820 in tandem.

Although plurality of suction cups 1812 and plurality of suction cups 1814 are depicted in FIG. 18, at least one of first walking robot 1800 or second walking robot 1802 may use an alternative form of holding components. For example, at least one of first walking robot 1800 or walking robot 1802 may use locking pins, a component gripper, or a conformal suction foot.

Figure 19:
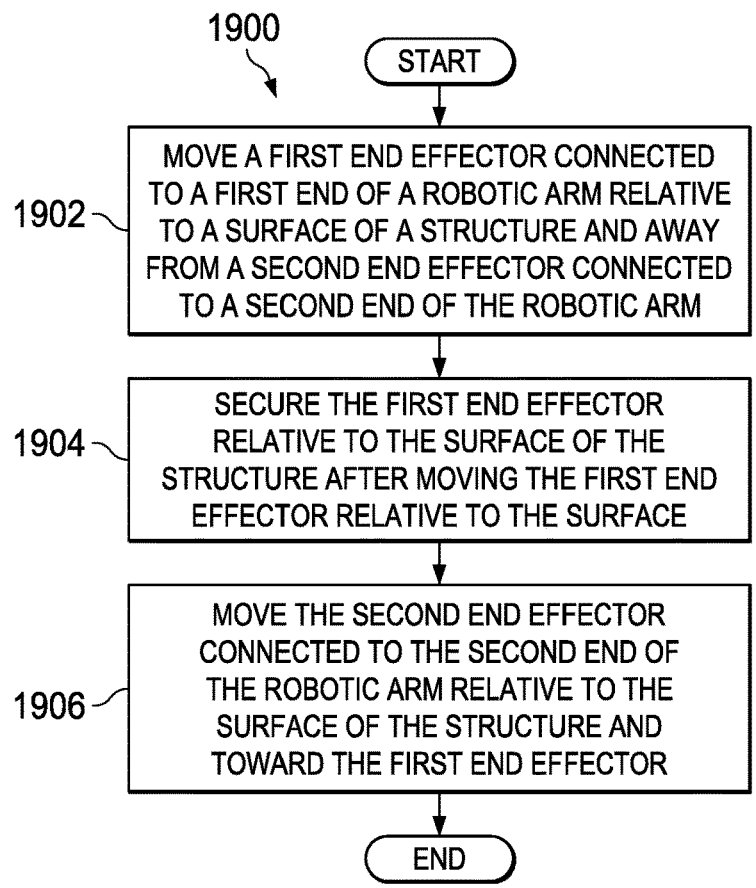
FIG. 19 is an illustration of a flowchart of a process for moving a walking robot across a structure in accordance with an illustrative embodiment.

Turning now to FIG. 19, an illustration of a flowchart of a process for moving a walking robot across a structure is depicted in accordance with an illustrative embodiment. Process 1900 may be a method of moving walking robot 202 across structure 206 of FIG. 2.

Process 1900 may move a first end effector connected to a first end of a robotic arm relative to a surface of a structure and away from a second end effector connected to a second end of the robotic arm (operation 1902). In some illustrative examples, the first end effector may comprise a first foot, and the second end effector may comprise a second foot. In some illustrative examples, the first end effector may further comprise a functional component.

Process 1900 may also secure the first end effector relative to the surface of the structure after moving the first end effector relative to the surface (operation 1904). Process 1900 may additionally move the second end effector connected to the second end of the robotic arm relative to the surface of the structure and toward the first end effector (operation 1906). Afterwards the process terminates.

Figure 20:
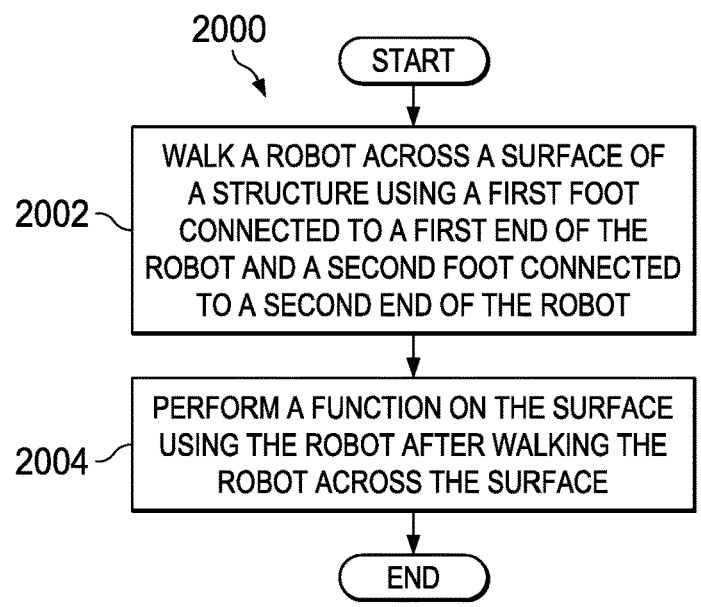
FIG. 20 is an illustration of a flowchart of a process for moving a walking robot across a structure in accordance with an illustrative embodiment.

Turning now to FIG. 20, an illustration of a flowchart of a process for moving a walking robot across a structure is depicted in accordance with an illustrative embodiment. Process 2000 may be a method of moving walking robot 202 across structure 206 of FIG. 2.

Process 2000 may walk a robot across a surface of a structure using a first foot connected to a first end of the robot and a second foot connected to a second end of the robot (operation 2002). Process 2000 may also perform a function on the surface using the robot after walking the robot across the surface (operation 2004). The function may be performed using a functional component associated with the second foot. Afterwards, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. For example, process 1900 may further comprise securing the second end effector relative to the surface of the structure after moving the second end effector.

Process 1900 may also comprise removing the second end effector from the second end after securing the second end effector; and connecting a third end effector to the second end of the robotic arm, wherein the third end effector is a functional component. Process 1900 may also perform a manufacturing function on the surface with the third end effector. Process 1900 may also remove the third end effector from the second end of the robotic arm after performing the manufacturing function on the surface; and connect the second end effector to the second end of the robotic arm after removing the third end effector from the second end of the robotic arm. Process 1900 may further comprise moving the first end effector relative to the surface of the structure; securing the first end effector relative to the surface of the structure after moving the first end effector relative to the surface; and moving the second end effector relative to the surface of the structure and toward the first end effector.

In some illustrative examples, process 1900 may also perform a function on the surface with a functional component of the second end effector after moving the second end effector relative to the surface. In some illustrative examples, the function is at least one of a manufacturing function, a maintenance function, or an inspection function, and process 1900 may further comprise securing the second end effector relative to the surface of the structure after moving the second end effector and prior to performing the function.

In some illustrative examples, process 2000 may further comprise removing the second foot from the second end of the robot after walking the robot across the surface; and connecting a functional end effector to the second end of the robot after removing the second foot from the second end of the robot, wherein the function is at least one of a manufacturing function, a maintenance function, or an inspection function, and wherein the function is performed on the surface using the functional end effector. In some illustrative examples, process 2000 may further comprise removing the functional end effector after performing the function on the surface; and connecting the second foot to the second end of the robot after removing the functional end effector from the second end. In some illustrative examples, process 2000 may further comprise walking the robot across the surface of the structure using the first foot and the second foot after performing the function.

Figure 21:
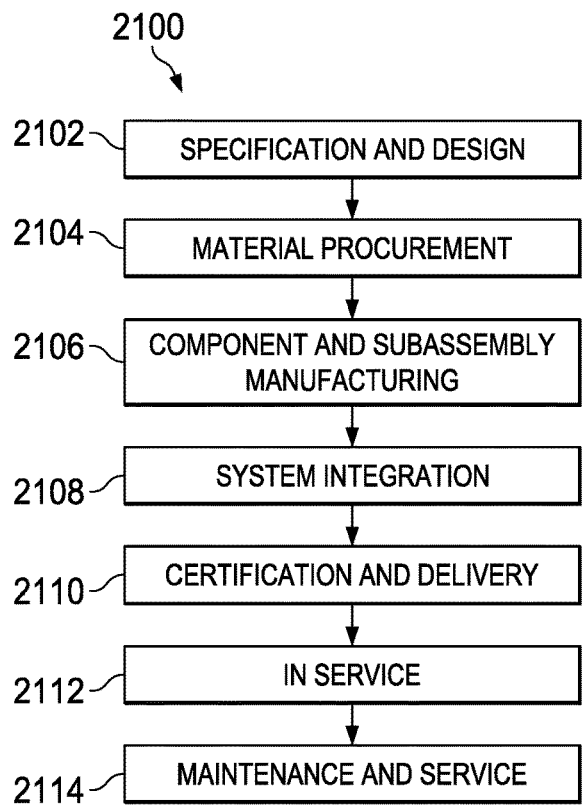
FIG. 21 is an illustration of an aircraft manufacturing and service method in the form of a block diagram in accordance with an illustrative embodiment.
Figure 22:
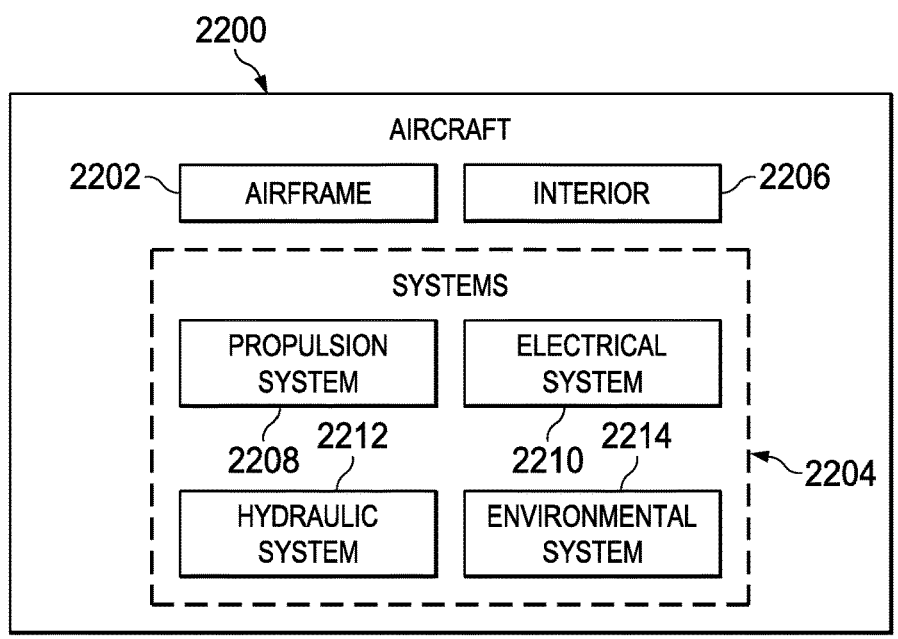
FIG. 22 is an illustration of an aircraft in the form of a block diagram in which an illustrative embodiment may be implemented.

The illustrative embodiments of the present disclosure may be described in the context of aircraft manufacturing and service method 2100 as shown in FIG. 21 and aircraft 2200 as shown in FIG. 22. Turning first to FIG. 21, an illustration of an aircraft manufacturing and service method is depicted in the form of a block diagram in accordance with an illustrative embodiment. During pre-production, aircraft manufacturing and service method 2100 may include specification and design 2102 of aircraft 2200 of FIG. 22 and material procurement 2104.

During production, component and subassembly manufacturing 2106 and system integration 2108 of aircraft 2200 of FIG. 22 takes place. Thereafter, aircraft 2200 of FIG. 22 may go through certification and delivery 2110 in order to be placed in service 2112. While in service 2112 by a customer, aircraft 2200 of FIG. 22 is scheduled for routine maintenance and service 2114, which may include modification, reconfiguration, refurbishment, and other maintenance or service.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of an aircraft is depicted in the form of a block diagram in which an illustrative embodiment may be implemented. In this example, aircraft 2200 is produced by aircraft manufacturing and service method 2100 of FIG. 21 and may include airframe 2202 with systems 2204 and interior 2206. Examples of systems 2204 include one or more of propulsion system 2208, electrical system 2210, hydraulic system 2212, and environmental system 2214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2100 of FIG. 21. One or more illustrative embodiments may be used during component and subassembly manufacturing 2106. For example, functions may be performed on aircraft 2200 using number of walking robots 280 during component and subassembly manufacturing 2106. In some examples, functions may be performed on aircraft 2200 using number of walking robots 280 during maintenance and service 2114.

Thus, the illustrative embodiments provide walking robots for the performance of functions on a structure. Using number of walking robots 280 to perform functions on structure 206 may take less time than using conventional pedestal robots connected to the manufacturing floor.

Using number of walking robots 280 may have a lower upfront cost than using conventional pedestal robots. Using number of walking robots 280 may eliminate or reduce fixturing in the manufacturing environment.

Further, number of walking robots 280 may have greater movement flexibility than other conventional robots. For example, number of walking robots 280 may move from the manufacturing floor onto the structure using a series of ramps or stairs. Number of walking robots 280 may not be placed by a human operator or a separate robotic arm onto the structure. Instead, number of walking robots 280 may move onto the structure on their own.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A robotic arm comprising:
   a first end connected to a first foot; and
   a second end connected to a functional component and to a second foot, wherein the functional component is housed within the second foot and the functional component is extractable from the second foot by the robotic arm.

2. The robotic arm of claim 1, wherein the functional component is extractable from the second foot after the second foot is secured to a surface.

3. The robotic arm of claim 2, wherein the functional component is selected from at least one of a drill, a brush, a sander, a cleaning tool, a paint gun, a buffer, a cutting tool, a welding tool, a camera, a probe, or a non-destructive sensor.

4. The robotic arm of claim 1, wherein the functional component is configured to operate on a surface to which the second foot is attached.

5. The robotic arm of claim 4, wherein the functional component is a drill or a sensor.

6. The robotic arm of claim 1, wherein the second foot comprises at least one of a number of suction cups, a number of locking pins, a conformal suction element, or a component gripper.

7. An apparatus comprising:
   a robot having a first end and a second end;
   a first end effector connected to the first end of the robot in which the first end effector comprises a first foot;
   a second end effector comprising a functional component connected to the second end of the robot; and
   a second foot removably engaged to the second end of the robot, wherein the second end effector is contained within the second foot.

8. The apparatus of claim 7, wherein the second foot comprises at least one of a number of suction cups, a number of locking pins, a conformal suction element, or a component gripper.

9. The apparatus of claim 8, wherein the second end effector is releasably engaged to the second foot.

10. The apparatus of claim 9, wherein the second end effector is extractable from the second foot after the second foot is secured to a surface.

11. The apparatus of claim 7, wherein the functional component is selected from at least one of a drill, a brush, a sander, a cleaning tool, a paint gun, a buffer, a cutting tool, a welding tool, a camera, a probe, or a non-destructive sensor.

12. The apparatus of claim 7, wherein the second end effector is housed within the second foot and configured to operate on a surface to which the second foot is attached.

13. A method comprising:
    moving a first foot connected to a first end of a robotic arm relative to a surface of a structure and away from a second foot connected to a second end of the robotic arm;
    securing the first foot relative to the surface of the structure;
    securing the second foot relative to the surface of the structure; and
    moving the second end of the robotic arm to extract a functional component from within the second foot.

14. The method of claim 13 further comprising:
    performing a function on the surface with the functional component.

15. The method of claim 14, wherein the function is at least one of a manufacturing function, a maintenance function, or an inspection function.

16. The method of claim 14, further comprising:
    securing the functional component inside the second foot upon completion of the function.

17. The method of claim 13, wherein the functional component is selected from at least one of a drill, a brush, a sander, a cleaning tool, a paint gun, a buffer, a cutting tool, a welding tool, a camera, a probe, or a non-destructive sensor.

18. A method comprising:
    walking a robot across a surface of a structure using a first foot connected to a first end of the robot and a second foot connected to a second end of the robot;
    securing the first foot and the second foot to the surface;
    using the second end of the robot, extracting a functional component from the second foot;
    performing a function on the surface using the functional component;
    removing the functional component from the surface after performing the function on the surface;
    using the second end of the robot, placing the functional component inside the second foot; and
    securing the second end of the robot to the second foot.

19. The method of claim 18, wherein the functional component is selected from at least one of a drill, a brush, a sander, a cleaning tool, a paint gun, a buffer, a cutting tool, a welding tool, a camera, a probe, or a non-destructive sensor.

20. The method of claim 18, wherein the function is at least one of a manufacturing function, a maintenance function, or an inspection function.

* * * * *